US007933748B1

(12) United States Patent
McCracken et al.

(10) Patent No.: US 7,933,748 B1
(45) Date of Patent: Apr. 26, 2011

(54) SYSTEM AND METHOD FOR FACILITATING SPECIFICATION ALLOCATION OF HIERARCHICAL SYSTEMS

(75) Inventors: Stephen McCracken, Hong Kong (HK); Enis Aykut Dengi, Tempe, AZ (US); Xuejin Wang, Chandler, AZ (US)

(73) Assignee: Cadence Design Systems, Inc., San Jose, CA (US)

( * ) Notice: Subject to any disclaimer, the term of this patent is extended or adjusted under 35 U.S.C. 154(b) by 574 days.

(21) Appl. No.: 11/958,389

(22) Filed: Dec. 18, 2007

(51) Int. Cl.
*G06F 17/50* (2006.01)
(52) U.S. Cl. .................. 703/2; 703/14; 703/17; 716/106
(58) Field of Classification Search ................ 703/2, 14, 703/6, 17; 716/4–6, 18, 106
See application file for complete search history.

(56) References Cited

U.S. PATENT DOCUMENTS

| 5,926,399 A * | 7/1999 | Berkooz et al. ................. 703/7 |
| 6,704,757 B1 * | 3/2004 | Ohmi et al. ..................... 708/3 |
| 6,721,922 B1 * | 4/2004 | Walters et al. ................. 716/1 |

OTHER PUBLICATIONS

Li, X. ; Wang, J. ; Pileggi, L. ; Chen, T. ; Chiang, W. ; "Performance-Centering Optimization for System-Level Analog Design Exploration" 2005. IEEE ACM ICCAD. pp. 421-428.
Chang, H ; et al. ; "A Top-down, Constraint-Driven Design Methodology for Analog Integrated Circuits" 1992. IEEE Custom Integrated Circuits Conference. pp. 8.4.1-8.4.6.
Kim, H.; Michelelena, N. ; Papalambros, P. ; Jiang, T. Target Cascading in Optimal System Design. Sep. 2003. Transactions of ASME vol. 125. pp. 474-480.
Deremaux, Y. ; Willcox, K. ; Haimes,R. "Physically-Based, Real-Time Visualization and Constraint Analysis in Multidisciplinary Design Optimization" 2003. American Institute of Aeronautics and Astronautics. pp. 1-11.
Eddy,J. ; Lewis, K. "Visualization of Multidimensional Design and Optimization Data Using Cloud Visualization" 2002. ASME proceedings of DETC '02. pp. 1-10.
Mueller, D. ; Stehr, G. ; Graeb, H. ; Schlichtmann, U. "Deterministic Approaches to Analog Performance Space Exploration (PSE)" 2005. Design Automation Conference. Jun. 13-17, 2005. pp. 869-874.
Agrawal, G. ; Bloebaum, C. ; Lewis, K. Intuitive Design Selection Using Visualized n-Dimensional Pareto Frontier. 2005. American Institute of Aeronautics and Astronautics. pp. 1-14.

(Continued)

*Primary Examiner* — Thai Phan
(74) *Attorney, Agent, or Firm* — Alford Law Group, Inc.; William E. Alford; George L. Fountain

(57) ABSTRACT

A system, method, and software program for facilitating the assignment of cell specifications to a plurality of cells of a system design. The methods include generating a plurality of candidate cell specifications that meet the specification for the system design. In one embodiment, the method entails using information related to intra-range preference for cell specifications to generate a set of alternative system pareto-optimal solutions which define a boundary of a region of candidate cell specifications. In another embodiment, the method entails generating a substantially uniform set of candidate cell specifications using a prediction-based performance model, such as support vector regression model or cluster-weighted model, an optimizing algorithm such as conjugate-gradient or Markov Chain Monte Carlo Method, and a sample density model. The method may also include graphically displaying substantially uniformly distributed cell performance data and corresponding system performance data, and allowing a user to focus on regions-of-interest via a selectable range graphic feature.

26 Claims, 16 Drawing Sheets

OTHER PUBLICATIONS

De Smedt, B.; Gielen, G. "Watson: Design Space Boundary Exploration and Model Generation for Analog and RF IC Design" 2003. IEEE Transactions on computer-aided design of integrated circuits and systems. pp. 213-224.

Smola, A.; Scholkopf, B. "A tutorial on support vector regression" 2004. Kluwer Academic Publishers. Statistics and Computing vol. 14. pp. 199-222.

Gershenfeld, N.; Schoner, B.; Metois, E. "Cluster-weighted modelling for time-series analysis" 1999. Macmillan Magazines Ltd. Nature, vol. 397, Jan. 28, 1999. pp. 329-332.

Silverman, B. "Density Estimation for Statistics and Data Analysis" 1986. ISBN 0-412-24620-1. Chapman & Hall/CRC.pp. 76-89.

Lovasz, L.; Vempala, S. "Hit-and-Run is Fast and Fun" Microsoft Technical Report, MSR-TR-2003-05. pp. 1-27.

\* cited by examiner

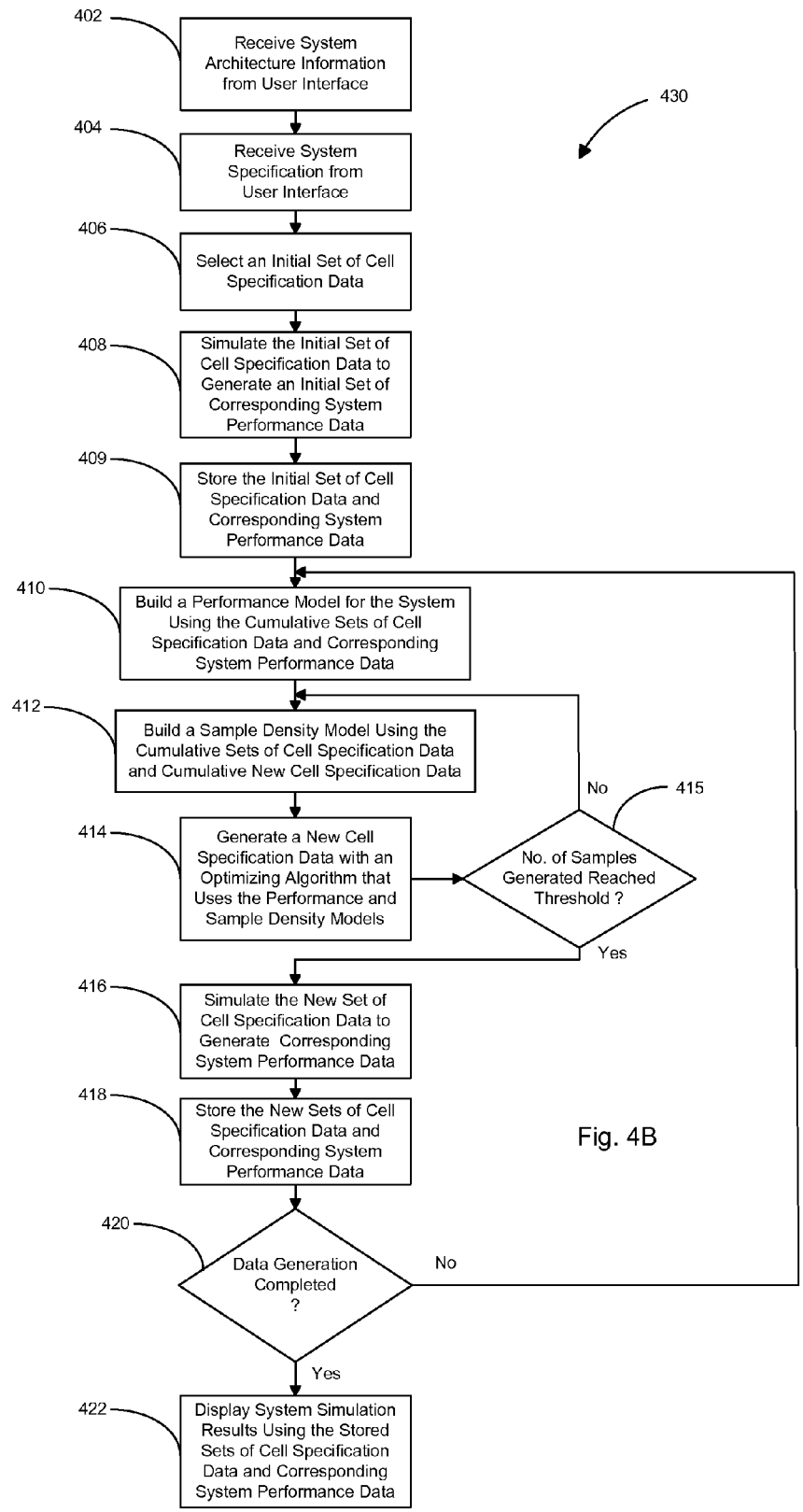

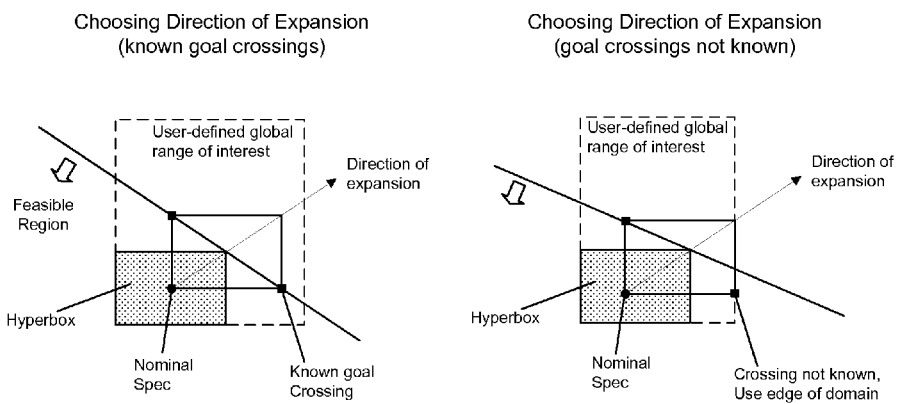
Fig. 12A
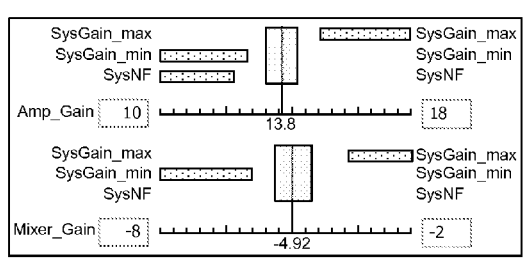
Fig. 12B
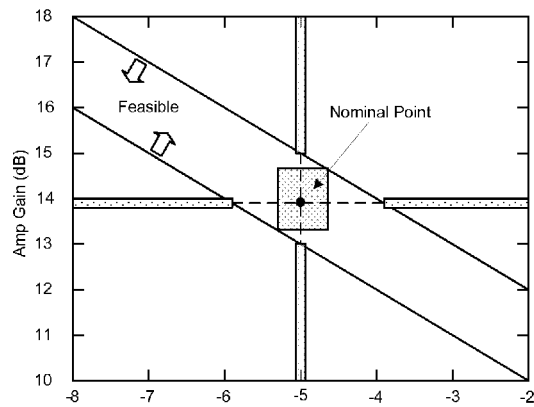

SYSTEM AND METHOD FOR FACILITATING SPECIFICATION ALLOCATION OF HIERARCHICAL SYSTEMS

FIELD OF THE INVENTION

This invention relates generally to computer-based systems for assisting designers with the allocation of specifications for hierarchical systems.

BACKGROUND OF THE INVENTION

In current design practice, an experienced system designer typically allocates specifications for cells of a system by hand. In this regard, the designer may create a simple performance model of the system using, for example, a spreadsheet containing analytic closed formulas. Then, by changing the inputs of the system performance model, the designer may search for a combination of cell-level specifications that strike a balance between achievable cell designs and system performance. The designer may consider a few cell performance corner cases in addition to the nominal case, but the resulting specifications are typically expressed as nominal values or upper and lower bounds.

The current practice of manually performing specification allocation generally has several drawbacks that may lead the designer to choose unachievable or undesirable specifications. First, the process of searching for specifications is typically very time consuming. A designer often has to repeatedly change cell specifications and observe the resulting system performance, as well as maintain corner cases, which significantly multiples the number of tasks that need to be performed. Second, typically the designer's consideration of the specifications is limited to at most a few points at a time, which may cause the designer to overlook of a better solution.

For example, it is often difficult to understand the tradeoff among multiple cell specifications, where tightening one specification may give slack to another. Additionally, it is also typically difficult to recognize cases where a sensitive parameter is undesirably close to a critical boundary. Together, these aforementioned drawbacks make specification allocation a labor-intensive process, which often discourages collaborative efforts among system and cell designers, further increasing the likelihood of an unachievable specification being chosen.

SUMMARY OF THE INVENTION

The invention is summarized by the claims that follow below.

BRIEF DESCRIPTION OF THE DRAWINGS

FIG. 4B illustrates a flow diagram of another exemplary method of generating candidate specification data of one or more cells of a system design in accordance with another embodiment of the invention.

FIG. 12A graphically illustrates exemplary methods of generating an exemplary hyperbox in accordance with another embodiment of the invention.

FIG. 12B illustrates an exemplary screen shot for visualizing an exemplary hyperbox in accordance with another embodiment of the invention.

DETAILED DESCRIPTION OF THE EXEMPLARY EMBODIMENTS

In the following detailed description of the embodiments of the invention, numerous specific details are set forth in order to provide a thorough understanding of the present invention. However, it will be obvious to one skilled in the art that the embodiments of the invention may be practiced without these specific details. In other instances, well known methods, procedures, components, and circuits have not been described in detail so as not to unnecessarily obscure aspects of the embodiments of the invention.

Figure 1:
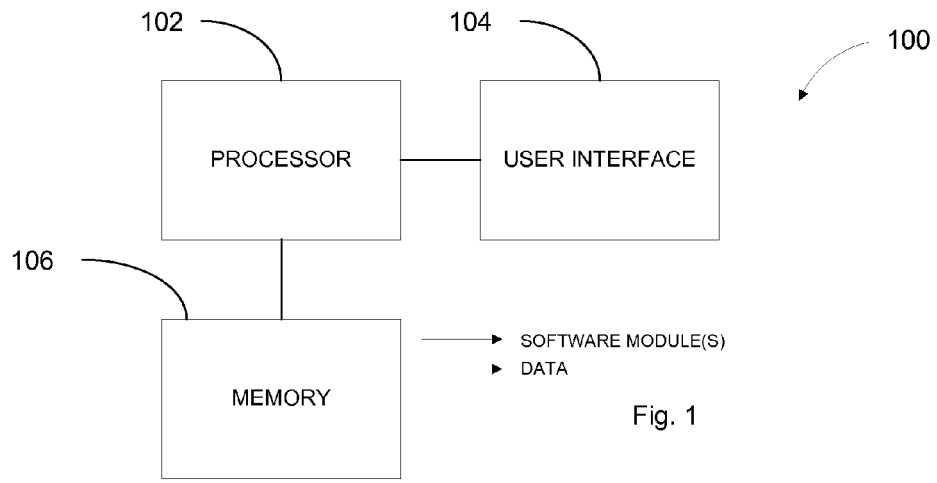
FIG. 1 illustrates a block diagram of an exemplary system for generating and displaying candidate specification data for one or more cells of a system design in accordance with an embodiment of the invention.

FIG. 1 illustrates a block diagram of an exemplary system 100 for facilitating the allocation of specification of a hierarchical system. In the exemplary embodiments described herein, the system 100 is configured to assist a designer in the allocation of an analog and/or radio frequency (RF) system including one or more analog and/or RF circuit cells. However, it shall be understood that the methodology, techniques, and algorithms described herein shall be applicable to other types of hierarchical systems.

Additionally, in the exemplary embodiments described herein, a two-level system is used to exemplify the various aspects of the invention. In the exemplary two-level system, the top level is the "system level" and the bottom level is the "cell level." In the examples described herein, specification allocation means deriving candidate specifications for cell based on how they perform in the system. However, it shall be understood that the specification allocation methodology, techniques and algorithms described herein are applicable to top-down design of systems having multiple levels of hierarchy.

In particular, the specification allocation system 100 may be configured as a computer system comprising one or more processors 102, a user interface 104, and a memory 106. Under the control of one or more software modules, the processor 102 performs the various operations of the specification allocation system 100, including generating and displaying candidate specification data for one or more cells of a system design using a multi-objective optimization algorithm and using preferences for one or more cell specifications, generating and displaying candidate specification data for one or more cells using a single-objective optimization algorithm, graphically displaying the candidate specification for one or more cells, such as in the form of a hyperbox or other forms, to assist a designer with specification allocation, performing "real-time" filtering operations in response to a user manipulating specification ranges, generating and displaying a hyperbox for specification allocation based on an aspect ratio specified by a user or heuristically determined based on single-variable margins.

The user interface 104 allows a user to send and receive information to and from the processor 102, as well as control the various operations performed by the processor 102. For example, the user interface 104 may comprise one or more input devices, such as a keyboard, a pointing device (e.g., a mouse, a track ball, etc.), a touch-sensitive display, microphone, etc. The user interface 104 may also comprise one or more output devices, such as a display (including a touch-sensitive display), speakers, etc. Using the one or more input devices of the user interface 104, a user may specify the system architecture information, system specification (e.g., goals) information, range-of-interest information for one or more cells, intra-range preference information for one or more cell specification, nominal value information for one or more cell, aspect ratio or direction of expansion for hyperbox, and other information and/or control as described herein. Using one or more output devices of the user interface 104, a user may view and manipulate the generated candidate cell specifications graphically displayed by the user interface 104.

The memory 106 may be any one or more computer readable mediums (e.g., RAM, ROM, magnetic hard disks, optical storage discs, etc.) for storing one or more software modules that control the processor 102 perform its various operations, as well as information that the processor 102 uses in performing the candidate cell specification generation methodology described herein. Such information may include system architecture information, system specification (e.g., goals) information, range-of-interest information for one or more cells, intra-range preference information for one or more cell specifications, nominal cell specifications, aspect ratio or direction of expansion for hyperbox, generated candidate specifications for cells, and other information and/or control as described herein.

Figure 2:
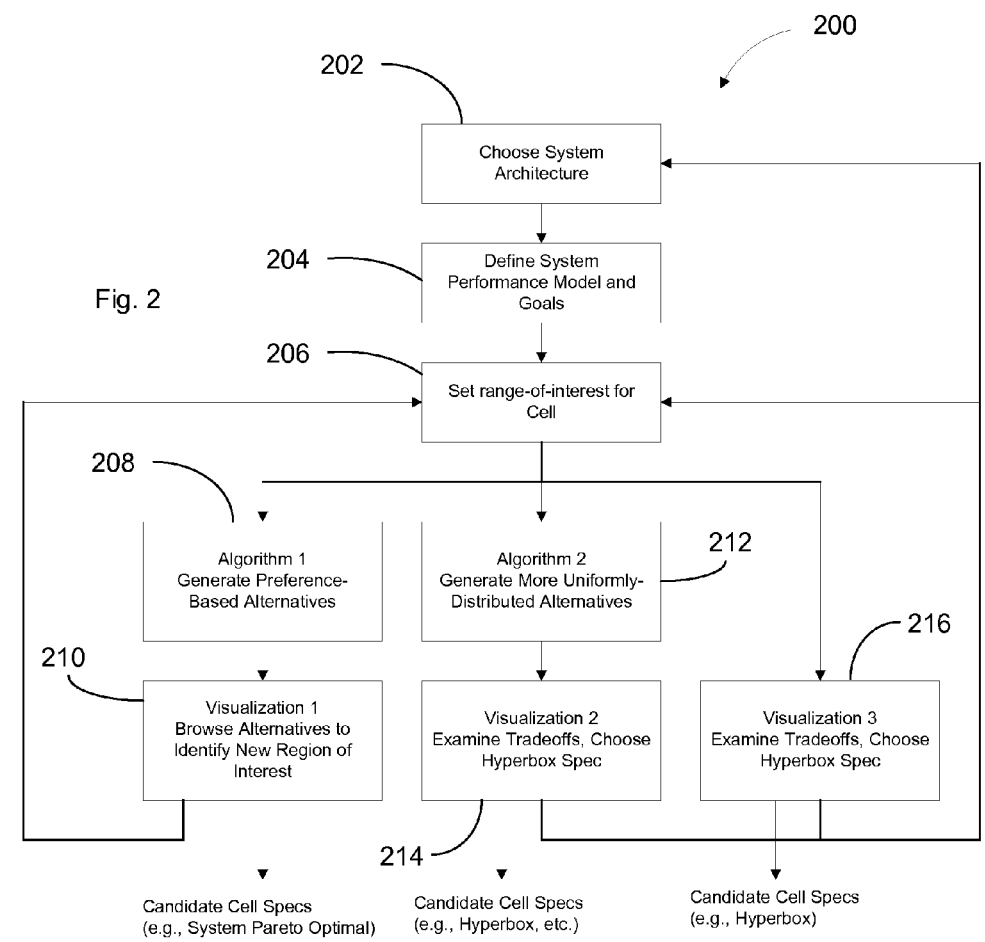
FIG. 2 illustrates an overview flow diagram of exemplary methods described herein for generating and displaying candidate specification data for one or more cells of a system design in accordance with another embodiment of the invention.

FIG. 2 illustrates an overview flow diagram of an exemplary method 200 described herein for generating and displaying candidate specification data for cells of a system design in accordance with an embodiment of the invention. Generally, the method 200 entails the processor 102 receiving system architecture information (e.g., a netlist) from a user using the user interface 104 (block 202). In the examples set forth below, a simple receiver system depicted in FIG. 3B is used to exemplify the various processes described herein. Using this example, a user may specify a system architecture comprising a system input at an input of an amplifier 352; the output of the amplifier 352 coupled to a first input of a mixer 354; a local oscillator (not shown) coupled to a second input of the mixer 354; and a system output at the output of the mixer 354.

According to the overview method 200, the processor 102 receives the system specification (e.g., goals) and performance model from the user interface 102 (block 204). Taking the receiver design of FIG. 3B as an example, a user may specify a system gain goal of between 8 and 10 dB, and a system noise figure (NF) goal of less than 3.0 dB. The user may also specify a system performance model for the system gain as follows:

$$\text{System\_Gain (dB)} = \text{Amp\_Gain (dB)} + \text{Mixer\_Gain (dB)}$$

The user may further specify a system performance model for the system noise figure (NF) as follows:

$$\text{System\_NF (dB)} = 10 \times \text{Log}\left[\left(10^{\frac{Amp\_NF}{10}}\right) + \frac{\left(10^{\frac{Mixer\_NF}{10}} - 1\right)}{\left(10^{\frac{Amp\_Gain}{10}}\right)}\right]$$

The above exemplary system performance model is simplified for illustrative purposes. In most cases, the system performance model may be substantially more complex. For example, a system performance model may include one or more analytic closed algorithms and/or one or more behavioral simulations algorithms.

Then, according to the overview method 200, the processor 102 receives range-of-interest for each cell of the system from the user interface 104 (block 206). Taking the receiver design of FIG. 3B as an example, the user may specify an Amp Gain range of 12 to 16 dB, an Amp NF range of 2 to 3 dB, a Mixer Gain of −8 to −2 dB, and a Mixer NF of 5 to 8 dB. Again, as discussed above, the above exemplary receiver design is simplified for illustrative purposes. In most cases, the system design may be substantially more complex. In such a case, the user may specify many ranges-of-interests for the various cells of the system design.

Once the processor 102 has received the information related to the system architecture, system goals and performance model, and cell range-of-interests, according to the method 200, the processor 102 may proceed to generate and display candidate specifications for one or more cells of the system design using various algorithms described herein. In one embodiment, the processor 102 may generate candidate cell specifications based on intra-range preferences specified by a user using the user interface 104 (block 208). Taking the receiver design of FIG. 3B as an example, the user may specify a preference that the Amp Gain is lower within the range-of-interest, and a preference that the Amp NF is higher within the range-of-interest. Based on these intra-range preferences, the processor 102 uses a multi-objective optimization algorithm to generate a plurality of system-pareto-optimal solutions for the cell specifications. The processor 102 may then graphically display the alternative cell specifications forming a boundary to a region of interest (block 210).

Alternatively, or in addition to, the processor 102 may also generate and display candidate specification for one or more cells of the system design in the case where the user may not have intra-range preferences for the cell specification within the range-of-interest (block 212). In such a case, the processor 102 generates a more uniform set of cell specifications. The processor 102 may then graphically display the alternative cell specifications within a region of interest, such as in the form of a hyperbox (block 214). Alternatively, or in addition to, the processor 102 may graphically generate candidate cell specifications including goal crossing and hyperbox having an aspect ratio specified by the user or heuristically determined (block 216). The aforementioned algorithms for generating and graphically displaying candidate cell specifications are discussed in more detail below.

Figure 3A:
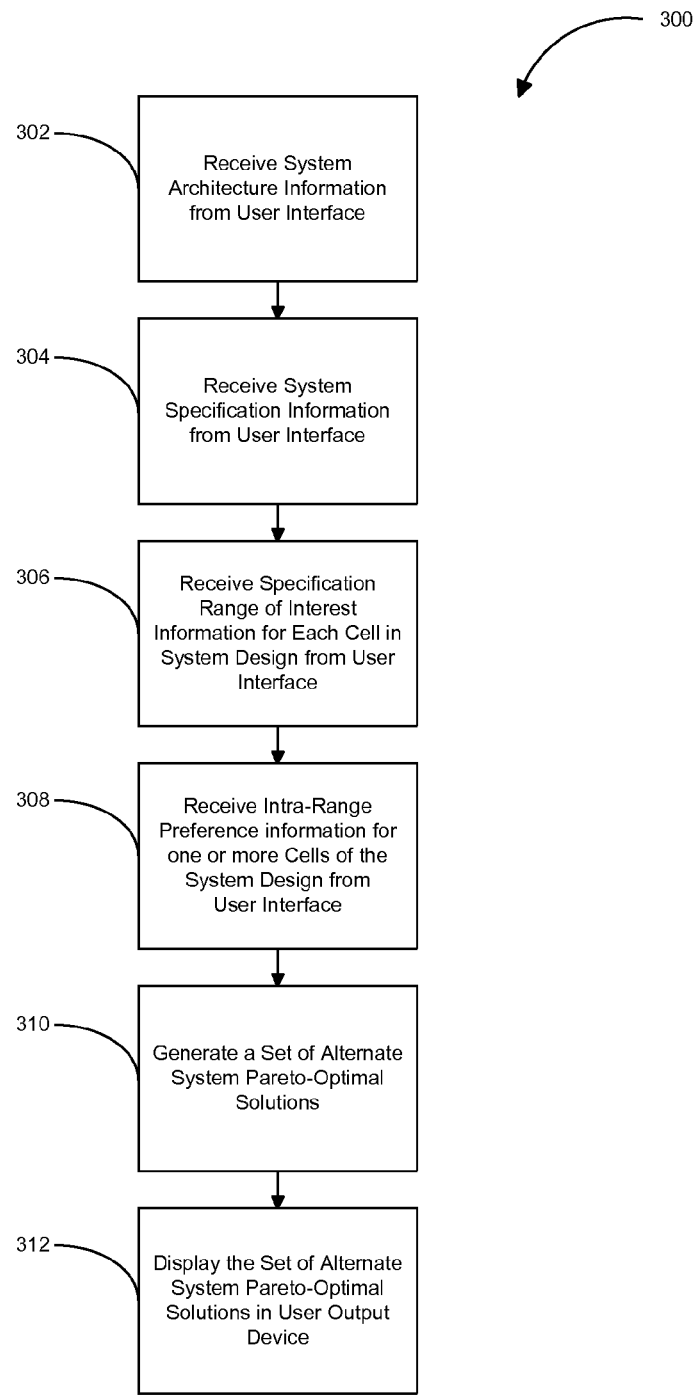
FIG. 3A illustrates a flow diagram of an exemplary method of generating candidate specification data for one or more cells of a system design in accordance with another embodiment of the invention.
Figure 3B:
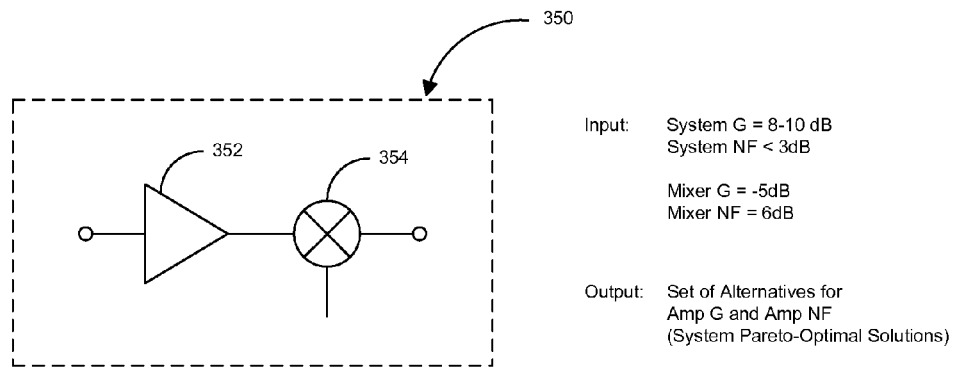
FIG. 3B illustrates an exemplary simplified receiver design used to exemplify the methodology and visualizations described herein in accordance with another embodiment of the invention.

FIG. 3A illustrates a flow diagram of an exemplary method 300 of generating candidate specification data for one or more cells of a system design in accordance with another embodiment of the invention. The method 300 may be used as a first step of narrowing down the ranges of interest, after which other methods may be used to derive a hyperbox specification. System-pareto-optimal points that are generated may be coupled into the GUI shown in FIGS. 8A-8F. A user may browse the GUI for a cell that looks appropriate, using his engineering judgment about cell feasibility. This method 300 may also be used when the user has intra-range preferences for the cell specifications within their corresponding ranges-of-interest. Taking the receiver design of FIG. 3B as an example, the user-specified intra-range preferences may indicate that the amplifier gain is preferred to be lower within the gain range-of-interest, and the amplifier NF is preferred to be higher within the NF range-of-interest. Using the intra-range preferences, the processor 102 uses a multi-objective optimization algorithm to generate a plurality of system-pareto-optimal solutions for the cell specifications, and graphically display solutions, which form a boundary to a cell specification region-of-interest. A user may have a preferred direction of expansion such as to may cells easier to design.

More specifically, according to the method 300, the processor 102 receives the system architecture information from the user via the user interface 104 (block 302). The system architecture may be in the form of a netlist or other form. For example, considering the receiver design of FIG. 3B, the user may specify a system architecture comprising a system input at the input of the amplifier 352; the output of the amplifier 352 coupled to the first input of a mixer 354; a local oscillator (not shown) coupled to the second input of the mixer 354; and a system output at the output of the mixer 354.

According to the method 300, the processor 102 also receives the system performance model and specification information from the user via the user interface 104 (block 304). The system performance model information may specify the closed analytic equations and/or behavior models for generating the system performance outputs from the cell specifications. For example, given a plurality of cell specifications $c_i$, the system performance model may be given by $f_j(c_i)$. Cell specifications may take on real, integer, and/or complex numbers. Examples of cell specifications include gain, noise figure (NF), $3^{rd}$ order intercept, and others. The system specification information may also specify the goals for the system. For example, the system goals may be one-side (e.g., $f_j<a$) or two-sided inequalities ($b<f_j<d$). As an example, for the receiver design of FIG. 3B, the user may specify a system gain goal of 8 to 10 dB, and a system noise figure (NF) goal of less than 3.0 dB.

According to the method 300, the processor 102 also receives information related to the range-of-interest for each cell in the system architecture from the user via the user interface 104 (block 306). For example, the user may specify a gain range for the amplifier 352 of 12 to 16 dB, a noise figure (NF) range for the amplifier 352 of 2 to 3 dB, a gain range for the mixer 352 of −8 to −2 dB, and a noise figure (NF) range of 5 to 8 dB. The processor 102 may also receive preference specification information for one or more cells of the system architecture from the user via the user interface 104 (block 308). For example, with regard to the receiver design of FIG. 3B, the user may specify a preference that the Amp_Gain is lower within the range-of-interest, and a preference that the Amp_NF is higher within the range-of-interest.

The processor 102 then generates a plurality of candidate cell specifications with a multi-objective optimization algorithm using the above specified information (block 310). In this regard, the processor 102 generates a plurality of system-pareto-optimal solutions which represent substantially optimal choices for the cell specifications with respect to the system. The multiple optimization objectives are the cell preferences. The system goals are hard constraints rather than optimization objectives. The system-pareto-optimal solutions specify cell specifications along a portion of a boundary of a region of candidate cell specifications that meet the systems goals. The portion of the region boundary is based on the intra-range preference information provided by the user.

Figure 3C:
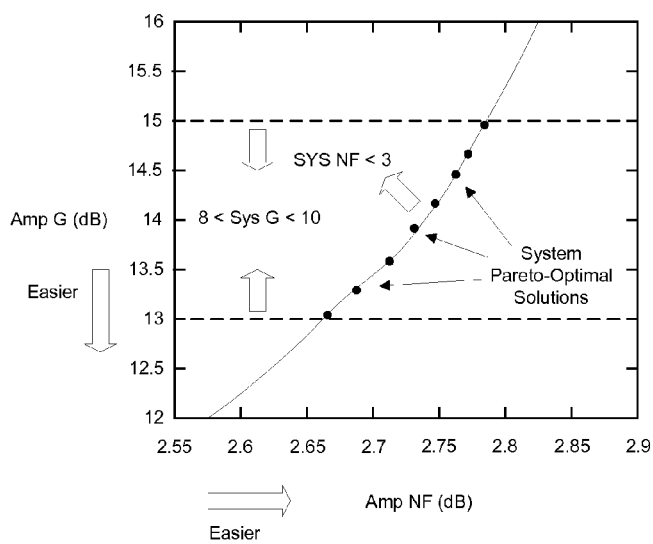
FIG. 3C illustrates an exemplary method of displaying candidate specification data of one or more cells of a system design in accordance with another embodiment of the invention.

The processor 102 may then graphically display the set of alternate system-pareto-optimal solutions in the user interface 104 (block 312). With reference to FIG. 3C as an example, the processor 102 may generate a graph depicting the system-pareto-optimal solutions of candidate cell specifications. In this example, the gain of the mixer 354 is given as −5 dB, and the noise figure (NF) of the mixer 354 is given as −6 dB. The graph includes an x- or horizontal axis indicating the amplifier noise figure (NF) from 2.55 to 2.9 dB, and a y- or vertical axis indicating the amplifier gain from 12 to 16 dB. The graph also shows horizontal dash lines indicating the lower and upper limits (13 to 15 dB) of the gain of the amplifier 352.

The graph also indicates the set of system-pareto-optimal solutions along the boundary of the region of candidate cell specifications for the amplifier gain and noise figure (NF) that meet the system performance of a gain of 8 to 10 dB and a noise figure (NF) of less than 3.0. As indicated in the graph, the region of candidate cell specifications for the amplifier 352 that meet system specification is bounded by the 13 dB gain line from the bottom, the 15 dB gain line from the top, and the system-pareto-frontier boundary including the system-pareto-optimal solutions from the right. In this case, the system-pareto-optimal solutions indicate the largest amplifier noise figure (NF) for a given amplifier gain that produces a system noise figure at its boundary of 3 dB. A user may select the system-pareto-optimal solutions as candidate cell specifications or may choose candidate cell specifications further within the acceptable cell specification region to build-in some margin of error. Accordingly, the cell specification generation and display provides useful information to a designer in performing specification allocation for the system design.

Figure 4A:
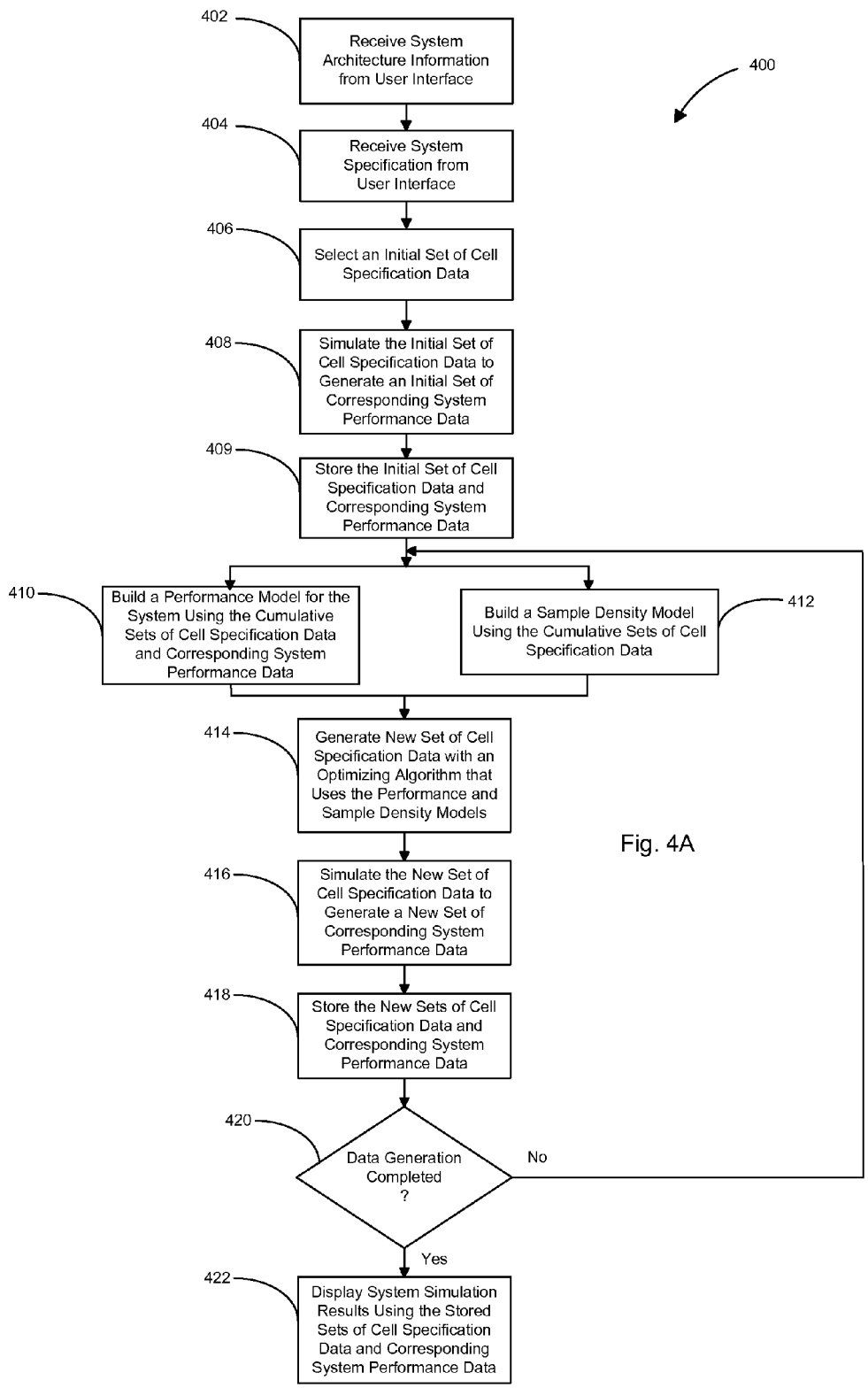
FIG. 4A illustrates a flow diagram of an exemplary method of generating candidate specification data for one or more cells of a system design in accordance with another embodiment of the invention.

FIG. 4A illustrates a flow diagram of an exemplary method 400 of generating candidate specification data for one or more cells of a system design in accordance with another embodiment of the invention. The method 400 may be particularly suited for applications where there is no or little preference within a range-of-interest for a cell specification. For example, perhaps the cell specification range covers reasonable values, and the designer has no preference within the range. As another example, if the preferences among alternative specification allocations are not well-defined, any part of the cell specification space could potentially be interesting. According to method 400, the system 100 may generate a more or substantially uniform dataset from a region of specification that includes at least a portion that satisfy the one or more system goals. Then, a designer can interactively browse or filter the dataset to find a desirable specification assignment.

According to the method 400, the processor 102 receives the system architecture information (of the system undergoing cell specification allocation) from the user via the user interface 104 (block 402). The processor 102 also receives the system specification information (e.g., system goals) from the user via the user interface 104 (block 404). The processor 102 then selects an initial set of cell specification data (block 406). The processor 102 then simulates the initial set of cell specification data to generate corresponding system performance data (block 408). For example, the processor 102 may use closed analytical equation and/or behavioral models to simulate the system performance to generate the corresponding system performance data. The processor 102 then stores the initial sets of cell specification data and corresponding system performance data in the memory 106 (block 409).

The processor 102 then builds a prediction-based performance model for the system design using the cumulative sets of cell specification data and corresponding system performance data (block 410). Examples of a prediction-based performance model include support-vector regression model, cluster-weighted model, and others. The prediction-based performance model is used to exclude cell specifications that result in corresponding system performance data that do not fall within the system goals, and select cell specifications that result in corresponding system performance data that fall within the system goals. The processor 102 also builds a sample density model from the cumulative sets of cell specification data (block 412). An example of a sample density model includes a kernel density estimation with a Gaussian kernel. The sample density model is used achieve a more uniform distribution of the cell specifications. Thus, it may be used to eliminate some cell specifications in regions of the cell specification space where there is a relatively high density of cell specification data. The sample density model is used to achieve a more uniform distribution of cell specifications by guiding the optimization algorithm (block 414) away from regions of the cell specification space where there is a relatively high density of cell specification data.

The processor 102 then generates a new set of input cell specification samples with an optimizing algorithm that uses the prediction-based performance model and the sample density model (block 414). An example of an optimizing algorithm is a conjugate-gradient type optimizer. As alluded to above, the optimization algorithm uses the prediction-based performance model to penalize cell specifications that fail the system goals, and uses the sample density model to favor cell specifications that lie in relatively low sample density regions. The processor 102 then simulates the new set of input cell specification samples to generate a new set of corresponding system performance data (block 416). As discussed above, the processor 102 may use closed analytical equation and/or behavioral models to simulate the system performance to generate the corresponding system performance data. The processor 102 then stores the new input cell specifications and corresponding system performance data in memory 106 (block 418).

The processor 102 then determines whether the data generation has been completed (block 420). There may be a number of basis for which the processor 102 may determine whether the data generation has been completed. For example, the processor 102 may determine the completion of the data generation when a predetermined number of data has been generated. Or, as another example, the processor 102 may determine the completion of the data generation when a predetermined number of data generation cycles have occurred. The parameter that determines when data generation is complete may be user specified or system default. If the processor 102 determines that the data generation is not complete, the processor 102 then re-builds the prediction-based performance model using the new and initial sets of cell specification data and corresponding system performance data per block 410. The processor 102 also re-builds the sample density model using the new and initial sets of cell specification data per block 412. If, on the other hand, the processor 102 determines that the data generation is complete, the processor 102 then displays the data generation results via the user interface 104 (block 422). Thus, the method 400 generates a substantially uniform set of cell specification data that meet the system goals or encompass the system goals by a predetermined margin factor to assist the user in assigning cell specifications for the system design.

FIG. 4B illustrates a flow diagram of another exemplary method 430 of generating candidate specification data of one or more cells of a system design in accordance with another embodiment of the invention. The method 430 is similar to method 400 previously discussed, and includes a number of the same operations as indicated by the same reference numbers. However, method 430 differs from method 400 in that the building of the sample density model in block 412 is updated each time a new cell specification is generated in block 414. Thus, after the prediction-based performance model is generated in block 410, the processor 102 enters a conditional loop comprising blocks 412, 414, and 415.

Upon entering the loop, the processor 102 builds the sample density model using the initial set of cell specification data (block 412). The processor 102 then generates a new input cell specification with the optimizing algorithm that uses the prediction-based performance model and sample density model (block 414). The processor 102 then determines whether the number of new cell specification data generated within the conditional loop has reached a threshold (block 415). If the processor 102 determines that the threshold has not been reached, the processor 102 then re-builds the sample density model using the accumulated cell specification data. That is, the accumulated cell specification data includes the initial set of cell specification data as well as the new cell specification data generated in block 414. If, on the other hand, the processor 102 determines that the number of new cell specification data generated reaches the threshold, then the processor 102 continues to block 416. The threshold may be user specified or system default.

Figure 5:
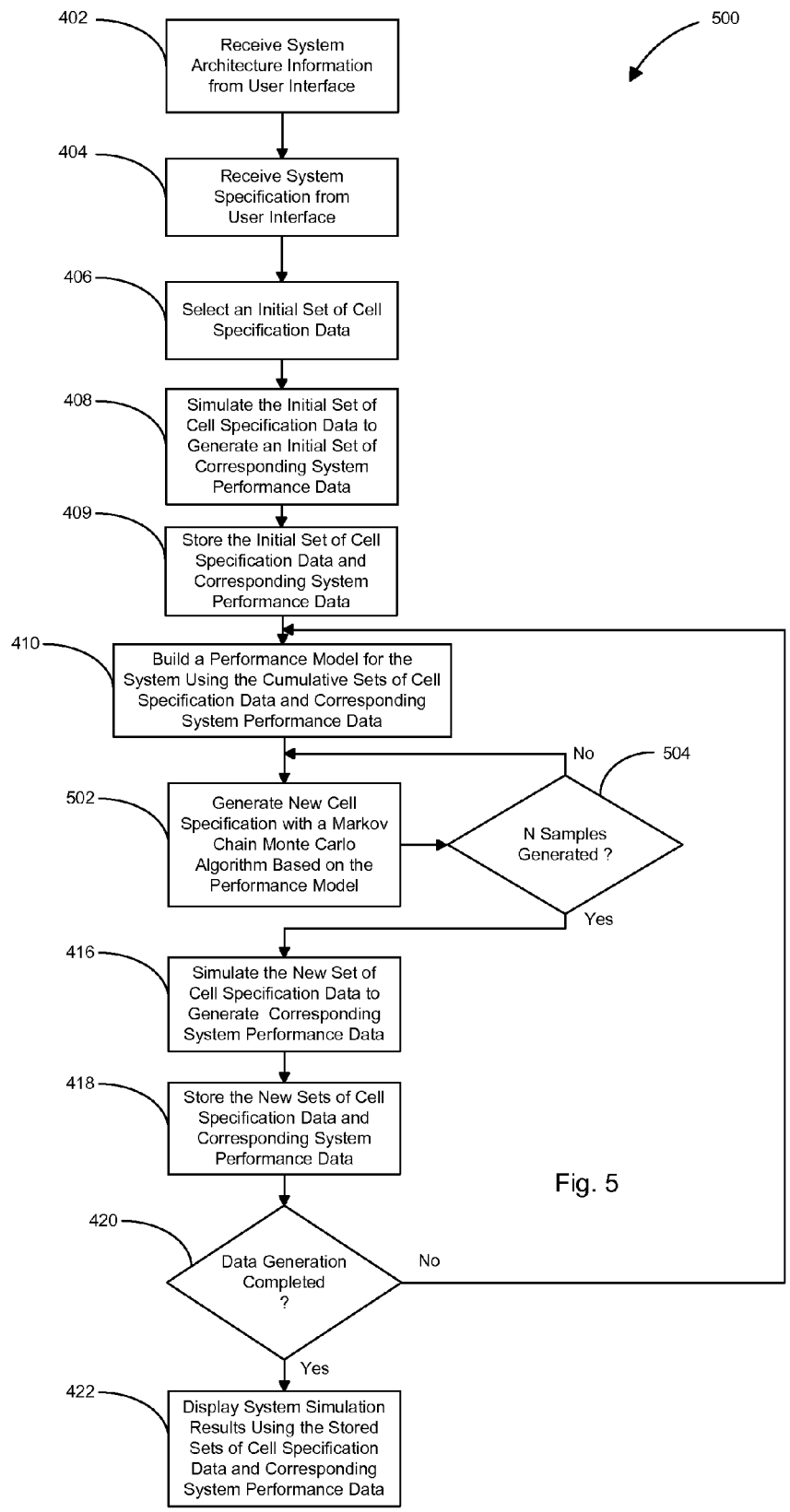
FIG. 5 illustrates a flow diagram of still another exemplary method of generating candidate specification data for one or more cells of a system design in accordance with another embodiment of the invention.

FIG. 5 illustrates a flow diagram of another exemplary method 500 of generating candidate specification data of one or more cells of a system design in accordance with another embodiment of the invention. The method 500 is similar to methods 400 and 430 previously discussed, and includes a number of the same operations as indicated by the same reference numbers. However, method 500 differs from the other methods 400 and 430 in that the new cell specification data are generated using a Markov Chain Monte Carlo (MCMC) algorithm that uses the prediction-based performance model.

More specifically, after the processor 102 builds the prediction-based performance model of the system in block 410, the processor 102 enters a conditional loop comprising blocks 502 and 504. In block 502, the processor 502 generates a new input cell specification data with a Markov Chain Monte Carlo (MCMC) algorithm that uses the prediction-based performance model. Examples of MCMC algorithms include Hit-and-Run Sampling, Gibbs Sampling, and others. The MCMC algorithm is capable of generating a substantially uniform distribution of input cell specification samples. With regard to Hit-and-Run Sampling, there is a somewhat build assumption that there is an efficient way to locate the boundary of the input cell specification space that achieves the system goals. To meet this assumption, the processor 102 may determine the boundary by performing a 1-Dimensional search algorithm, such as the Newton's method.

Starting from a current location point with Hit-and-Run Sampling, a search direction is randomly picked; 2) a performance model (and a 1-d Newton's method) is used to determine the location of the feasibility boundary, along the given search direction; and 3) to make the step, just move the point to a random place along the line connecting its current location and the feasibility boundary point (or the range-of-interest boundary, if no feasibility boundary was found).

The Gibbs Sampling algorithm may be implemented similarly to the Hit-and-Run Sampling algorithm. However, the Gibbs Sampling algorithm changes one variable at a time, while the Hit-and-Run Sampling algorithm can move in any direction by changing several variables. Both algorithms should avoid taking a step into the region where the system goals are not met. One way of locating the boundary is by using Newton's method before taking the step. However, a simpler "rejection method" may also be employed. In using a simple rejection method, the method keeps re-trying the step until it lands in an acceptable region.

After the new input cell specification data is generated, the processor 102 determines whether a predetermined number N of new input cell specification data have been generated (block 504). If the processor 102 determines that the predetermined number N of new input cell specification data have not been generated, the processor 102 repeats the operation of block 502 and generates another new input cell specification data using the prediction-based performance model and the accumulated new cell specification data generated in block 502. If, on the other hand, the processor 102 determines that the predetermined number N of new input cell specification samples have been generated, the processor 102 continues to block 416. The predetermined number N may be user specified or a system default.

Figure 6:
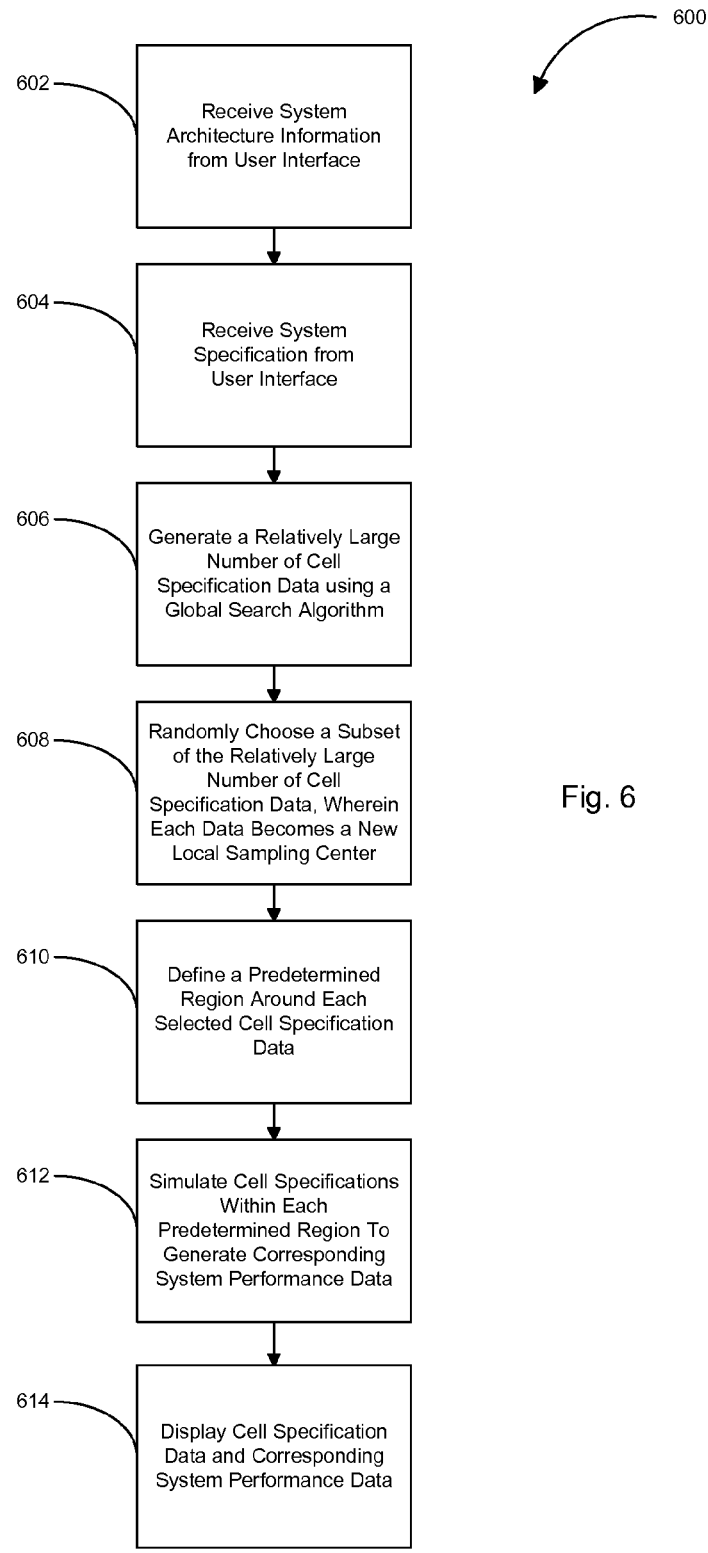
FIG. 6 illustrates a flow diagram of yet another exemplary method of generating candidate specification data of one or more cells of a system design in accordance with another embodiment of the invention.

FIG. 6 illustrates a flow diagram of yet another exemplary method 600 of generating candidate specification data of one or more cells of a system design in accordance with another embodiment of the invention. A concept behind method 600 is to use a global search algorithm that generates a variety of candidate cell specification data, and then enhance the variety through local exploration. For example, the processor 102 may search for acceptable cell specification data using a simulated annealing algorithm that visits a relatively large number of acceptable solutions. To generate additional variety, the processor 102 takes a random set of acceptable solutions as center points, and samples substantially uniformly in a predetermined region around each center.

More specifically, according to the method 600, the processor 102 receives the system architecture information from the user via the user interface 104 (block 602). The processor 102 also receives the system specification information (e.g., the system goals) from the user via the user interface 104 (block 604). The processor 102 then generates a relatively large number of cell specification data that meet the system goals or encompass the system goals by a predetermined margin factor (block 606). The processor 102 then randomly or pseudo-randomly chooses a subset of the relatively large number of cell specification data generated in block 606 (block 608). The processor 102 treats each of the input cell specification data in the subset as a new local sampling center.

The processor 102 then defines a predetermined region or neighborhood around each local sampling center (block 610). The processor 102 then simulates new cell specification data lie within each of the respective predetermined regions around local sampling center (block 612). As previously above, the processor 102 may use closed analytical equation and/or behavioral models to simulate the system performance to generate the corresponding system outputs. The processor 102 then displays the simulated cell specification data and corresponding system performance data (block 614).

Figure 7:
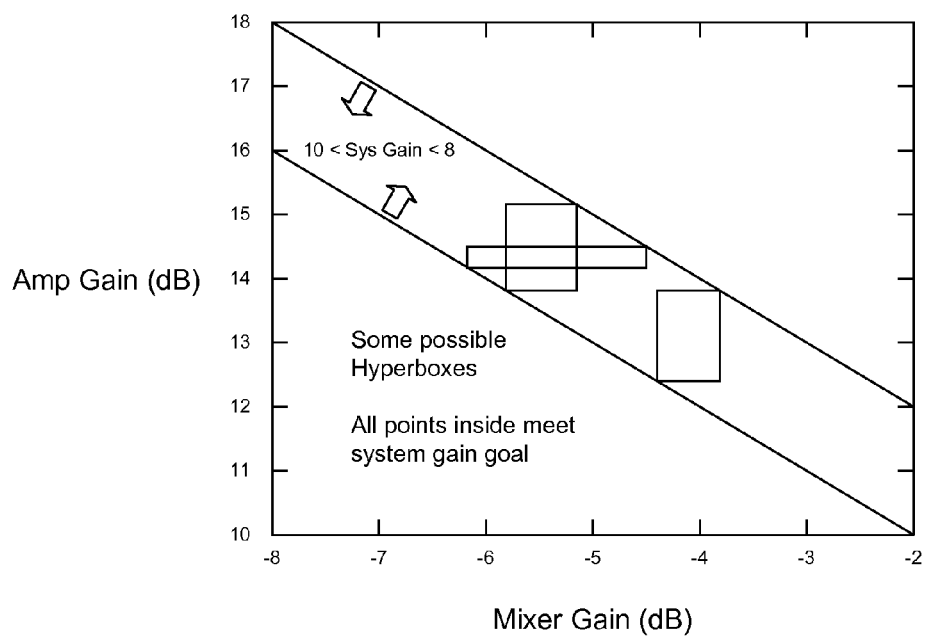
FIG. 7 illustrates a graph for explaining the concept of a hyperbox as used herein in accordance with another embodiment of the invention.

FIG. 7 illustrates a graph for explaining the concept of a hyperbox as used herein in accordance with another embodiment of the invention. Traditional cell specifications often come in the form of a nominal value (e.g., gain=10 dB). However it is possible to give more flexibility to a designer by assigning a range to the cell specification, instead of a nominal value (e.g., 9.5 dB to 10.5 dB). If the specification ranges or cell specifications are chosen such that any combination from the ranges would produce a system within specification, then cell designers can work independently and their final designs would still be compatible. The Cartesian product of range specifications is often referred to as a "hyperbox." This is better explained with reference to the example provided in FIG. 7.

Using the receiver design example of FIG. 3B previously discussed, the x- or horizontal axis of the graph of FIG. 7 represents the gain of the mixer 354 ranging from −8 dB to −2 dB. The y- or vertical axis of the graph represents the gain of the amplifier 352 ranging from 10 dB to 18 dB. In this example, the system gain goals are 8 dB to 10 dB. As shown in the graph, the region between two diagonal lines delineates the region of cell specifications for the amplifier and mixer gains that meet the system goals for a given amplifier gain or a given mixer gain. So, for a given amplifier gain of 13 dB, the mixer gain can range between −5 dB and −3 dB in order to meet the system gain goal of 8 dB to 10 dB. As another example, for a given mixer gain of −5 dB, the amplifier gain can range between 13 dB to 15 dB in order to meet the system gain goal.

The graph of FIG. 7 also notes three exemplary hyperboxes having different aspect ratios and located at different locations within the region delineated by the two diagonal lines. Each hyperbox delineates a sub-region of cell specifications that meet the system goal, and can be achieved even though the amplifier and mixer are independently designed. For example, taking the right-most hyperbox in the graph as an example, this hyperbox indicates that a mixer gain specification lying anywhere within −4.4 dB to −3.8 dB and an amplifier gain lying anywhere within 12.4 to 13.8 would result in the system gain goal of 8 dB to 10 dB being achieved. Thus, in such situation, given these gain ranges for the mixer and amplifier, each of the cells may be independently designed, and when subsequently integrated, the system gain goal should be achieved.

Although only three hyperboxes are shown, it shall be understood that many other hyperboxes having different aspect ratios and different locations within the region delineated by the diagonal lines may be selected for arriving at cell specifications for the amplifier and mixer gains. Furthermore, in this example, the hyperbox shown are two-dimensional for ease of illustrating. It shall be understood that a hyperbox may have more than two dimensions. For example, if the exemplary receiver design further included an intermediate frequency (IF) amplifier, then the hyperbox may be three-dimensional to take into account the respective gains of the LNA 352, the mixer 354, and the IF amplifier.

Generally, selecting a hyperbox typically requires making tradeoffs on both the relative difficulty of meeting the cell specification and the amount of flexibility given for each cell specification. In making these tradeoffs, a system designer would typically draw upon past experience and might discuss the tradeoff with cell designers. The visualization described herein as follows assists a designer in deriving hyperbox specification interactively.

Figure 8A:
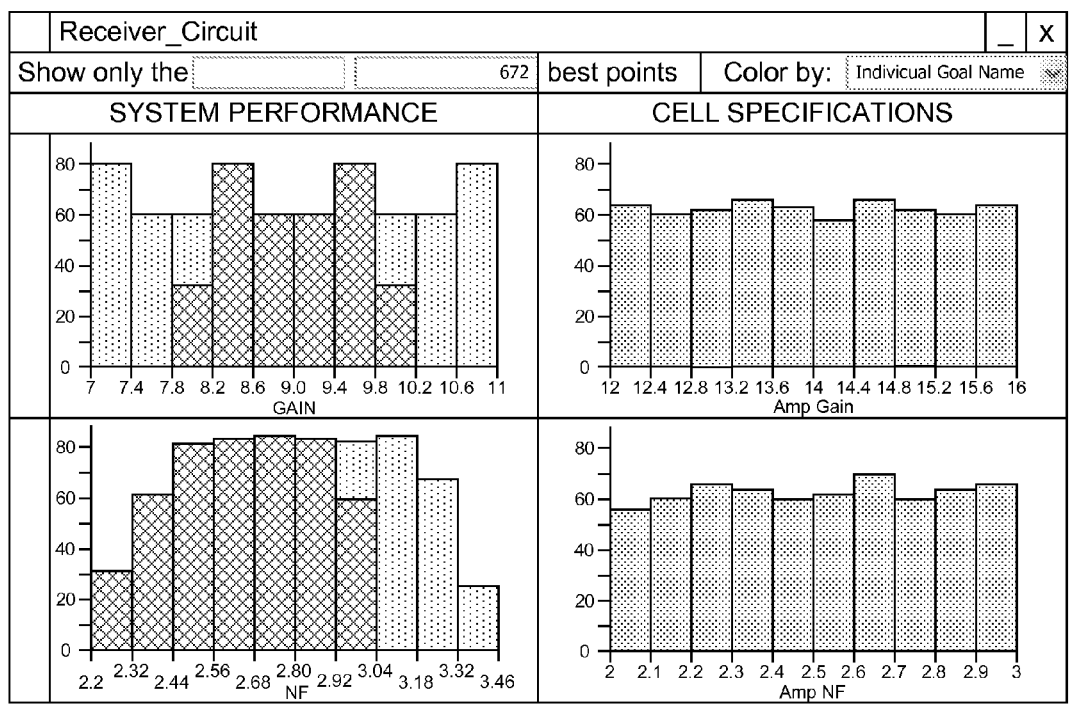
FIGS. 8A-F illustrate various exemplary screen shots for visualizing cell specification data and corresponding system performance data in accordance with other embodiments of the invention.

FIG. 8A illustrate an exemplary screen shot for visualizing cell specification data and corresponding system performance data in accordance with another embodiment of the invention. The processor 102 may cause the display of the screen shot on the user interface 104. The screen shows four bar graphs, two on the left portion of the screen shot and two on the right portion of the screen shot. The bar graphs on the left portion of the screen relate to system performance, and the bar graphs on the right portion of the screen relate to cell specifications. Taking the receiver design of FIG. 3B as an example again, the bar graph on the upper-left portion of the screen relates to the system gain, the bar graph on the lower-left portion of the screen relates to the system noise figure (NF), the bar graph on the upper-right portion of the screen relates to the amplifier gain, and the bar graph on the lower-right portion of the screen relates to the amplifier NF.

The x- or horizontal axis of the upper-left bar graph indicates a gain range for the system of 7 dB to 11 dB. The x- or horizontal axis is also sub-divided by adjacent bins or sub-ranges, within which a particular bar lies. For example, the specific bins or sub-ranges in this example include 7-7.4, 7.4-7.8, 7.8-8.2 . . . to 10.6-11. The y- or vertical axis of the upper-left bar graph indicates the number of system data points generated by the processor 102, such as by performing any of the various cell specification data generation methods previously discussed. For example, the bar pertaining to bin 7-7.4 indicates that 80 system performance data points were generated that resulted in a system gain of 7-7.4 dB. Similarly, the bar pertaining to bin 9.0-9.4 indicates that 60 system performance data points were generated that resulted in a system gain of 9.0-9.4 dB.

In this example, the particular shading of each bar or portion thereof indicates whether the corresponding system performance data points do or do not meet the system goal. For example, the shading consisting of the cross-hatching indicates that such system performance data points meet the system goal. Whereas, the shading consisting of the lightly-dense dots indicates that such system performance data points do not meet the system goal. Thus, considering the upper-left bar graph related to the system gain, the bars pertaining to the four bins between 8.2 and 9.8 dB include the cross-hatching shade because all points within those bins meet the system gain goal of 8-10 dB. The bars pertaining to the four bins between 7-7.8 dB and 10.2-11 dB include the lightly-dense dots shade because all points within those bins do not meet the system gain goal. For bars pertaining to bins 7.8-8.2 dB and 9.8-10.2 dB, a portion of each bar includes cross-hatching shade pertaining to points that meet the system gain goal, and another portion includes the lightly-dense dots pertaining to points that do not meet the system gain goal.

Although different styles of shading are used in this example to indicate whether the points meet or do not meet the system goal, it shall be understood that other visual indicators may be used. For example, the color green may be used to indicate that the corresponding points meet the system goal, whereas the color red may be used to indicate the corresponding points do not meet the system goal. Other types of visual indicators may also be used, such as symbols, words, codes, or any combination of any of the visual indicators previously discussed, etc.

The lower-left bar graph related to the system NF may be similarly configured as the upper-left bar graph related to the system gain. As the system NF bar graph indicates, the bars pertaining to the five bins ranging from 2.2-2.92 dB include the cross-hatching shade because the corresponding points meet the system NF goal of less than 3.0 dB. The bars pertaining to the three bins ranging from 3.04 to 3.46 include the lightly-dense dots shade because the corresponding points do not meet the system NF goal. The bar pertaining to bin 2.92 and 3.04 dB includes a portion having the cross-hatching shade indicating that the corresponding points meet the system NF goal, and another portion having the lightly-dense dots indicating that the corresponding points do not meet the system NF goal.

The upper-right bar graph related to the gain of the amplifier 352 includes 10 bars pertaining to bins 12-12.4, 12.4-12.8, 12.8-13.2 . . . 15.6-16. These bars are shaded with heavy-dense dots to indicate the points fall within a selectable system goal range that a user can graphically manipulate, as discussed in more detail below with reference to FIG. 8B. Similarly, the lower-right bar graph related to the NF of the amplifier 352 includes 10 bars pertaining to bins 2-2.1, 2.1-2.2, 2.2-2.3 . . . 2.9-3 dB. As above, these bars are shaded with heavy-dense dots to indicate the points fall within a selectable system goal range that a user can graphically manipulate. Since in this example, the selectable system goal range is not shown, the respective system goal range covers the full scale of the system gain range (7-11 dB), and the system NF range (2.2-3.46 dB).

Note that in the example of FIG. 8A, the system performance data points generated by the processor 102 extends beyond the system gain goals. For example, with regard to the system gain, the system performance data points generated range from 7 dB to 11 dB, which extends beyond the system gain goal of 8 dB to 10 dB. Similarly, with regard to the system NF, the system performance data points generated range from 2.2 dB to 3.46, which extends beyond the system NF goal of less than 3 dB. Thus, as discussed above with reference to the various data generation algorithm, the processor 102 may generate data that encompass the system goals by a predetermined margin factor. This allows a user to better visualize the boundaries of the system specifications.

The screen shot of FIG. 8A may include additional information, such as the name of the system undergoing the specification allocation (e.g., Receiver_Circuit). The screen shot may also show how many data points were generated (e.g., 672). The screen shot may include a pull down menu for controlling the visual indicators pertaining to the bar graphs. Other information and/or control related to data generation and visualization may be provided.

Figure 8B:
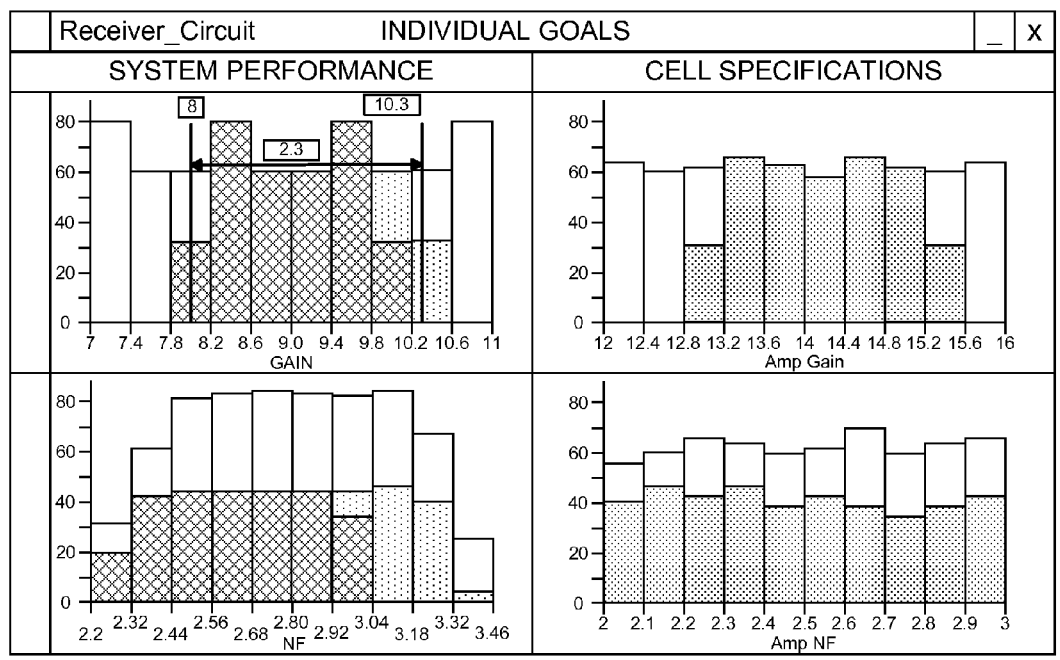

FIG. 8B illustrates another exemplary screen shot for visualizing cell specification data and corresponding system performance data in accordance with another embodiment of the invention. In this exemplary screen, the upper-left bar graph pertaining to the system gain goal includes a selectable system goal range noted by the two vertical range lines. The left vertical range line delineates the lower boundary of the selectable system goal range, and the right vertical range line delineates the upper boundary of the selectable system goal range.

In this example, the lower vertical range line is set to 8 dB for the gain for the amplifier 352, and the right vertical range line is set to 10.3 dB for the gain for the amplifier 352. Additionally, the screen also includes a horizontal range line which indicates the extent of the range. In this example, the horizontal range line indicates a range of 2.3 dB (i.e., 10.3-8 dB).

The selectable system range goal may be graphically manipulated by a user using the user interface 104. For example, a user may graphically position (e.g., by a click and drag operation) the lower and upper range boundary lines using, for example, a pointing device (e.g., a mouse, track ball, etc.), to any desired values to select a particular range of interest. In response to receiving the corresponding control signals from the user interface 104, the processor 102 may change the visual indication of at least a portion of one or more respective bars to indicate that the corresponding points fall out of the selectable system goal range selected by the user. The processor 102 may perform the visual indication change operation for one or more affected bar graphs.

For example, with regard to the system gain bar graph, the processor 102 has changed the lightly-dense dots shade previously on the bars (See FIG. 8A) pertaining to the three bins 7-7.4 dB, and 7.4-7.8 dB, and 10.6-11 dB to a solid hue (e.g., white), as indicated. This means that the corresponding system performance data points pertaining to such bars fall out of the selectable system goal range which, in this example, is set to 8-10.3 dB. Also, the processor 102 has also changed the lightly-dense dots shade previously on respective portions on the bars pertaining to the bins 7.8-8.2 dB and 10.2-10.6 dB to a solid hue (e.g., white), as indicated. This means that the corresponding system performance data points pertaining to such portions also fall out of the selectable system goal range.

Not only does the processor 102 change the visual indication of the affected bars of the bar graph for which the selectable system goal range pertains, but the processor 102 also change affected bars in other bar graphs. For example, the processor 102 has changed the previous shading on several of the bars (and portions thereof) of the amplifier gain bar graph to the solid hue because the corresponding amplifier gain points no longer result in a system gain that falls within the selectable system goal range. Similarly, the processor 102 has changed the previous shading on portions of the bars of the amplifier NF bar graph to the solid hue because the corresponding points no longer result in a system gain that falls within the selectable system goal range. In a similar fashion, the processor 102 has changed the previous shading on portions of the bars of the system NF bar graph to the solid hue because the corresponding points no longer result in a system gain that falls within the selectable system goal range.

As can be seen, the selectable system goal range may be useful to a user in allocating specification to cells of a system. For example, a user may position the selectable system goal range at the high end of the system specification goals, and see what effects such adjustment has on one or more cell specification bar graphs. If the selectable system goal range being at the high end results in difficult to achieve cell specifications, the user may change the selectable system goal range to determine whether the corresponding cell specifications are easier to achieve. The selectable goal range may be in any of the bar graphs, including the system gain bar graph as previously illustrated, the system NF bar graph, as well as the cell specification graphs, such as the amplifier gain bar graph and the amplifier NF bar graph, and as well as any other system goal and cell specification bar graphs that may apply. Additionally, a user may also put a selectable range on more than one plot at a time. In which case, a point may be shaded in a solid hue if the point falls outside of any one of the selectable ranges.

Figures 8C, 8E:
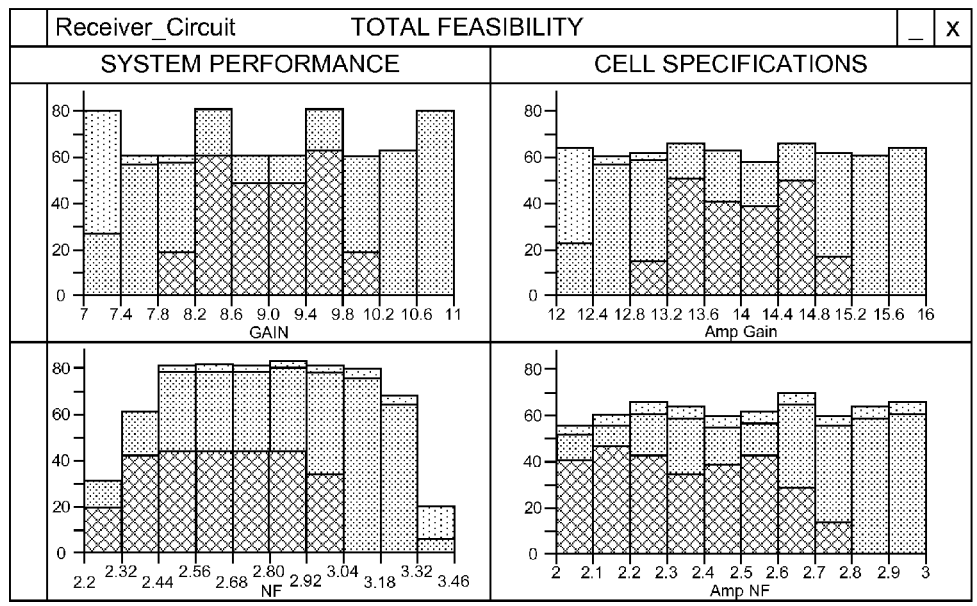

FIG. 8C illustrates another exemplary screen shot for visualizing cell specification data and corresponding system performance data in accordance with another embodiment of the invention. The processor 102 may cause the display of this screen shot on the user interface 104 using the data generated by any of the previously discussed data generation algorithm. The screen shot may be particularly useful in feasibility studies because it provides information related to points that meet the system goals, points that do not meet the system goals but are within a predetermined margin (e.g., 10 percent) of meeting the system goals, and points that do not meet the system goals by greater than the predetermined margin. In this example, the cross-hatching shade on the bars indicates that the corresponding points meet the system goals, the heavy-dense dots shade on the bars indicates that the corresponding points do not meet the system goals but are within a predetermined margin (e.g., 10 percent) of meeting the system goals, and the lightly-dense dots shade on the bars indicates that the corresponding points do not meet the system goals by greater than the predetermined margin. The selectable goal range may apply to the total feasibility screen in order for the user to focus the analysis to regions of interest, as previously discussed.

Additionally colors may be used on the bars instead of hatching to indicate whether or not system goals are met within a predetermined margin. For example, the color green may indicate that all goals are met, the color yellow may indicate at least one goal is not met, but all performances are within 10% of their individual goal values, and red may indicate at least one performance is more than 10% away from its goal value.

Figure 8D:
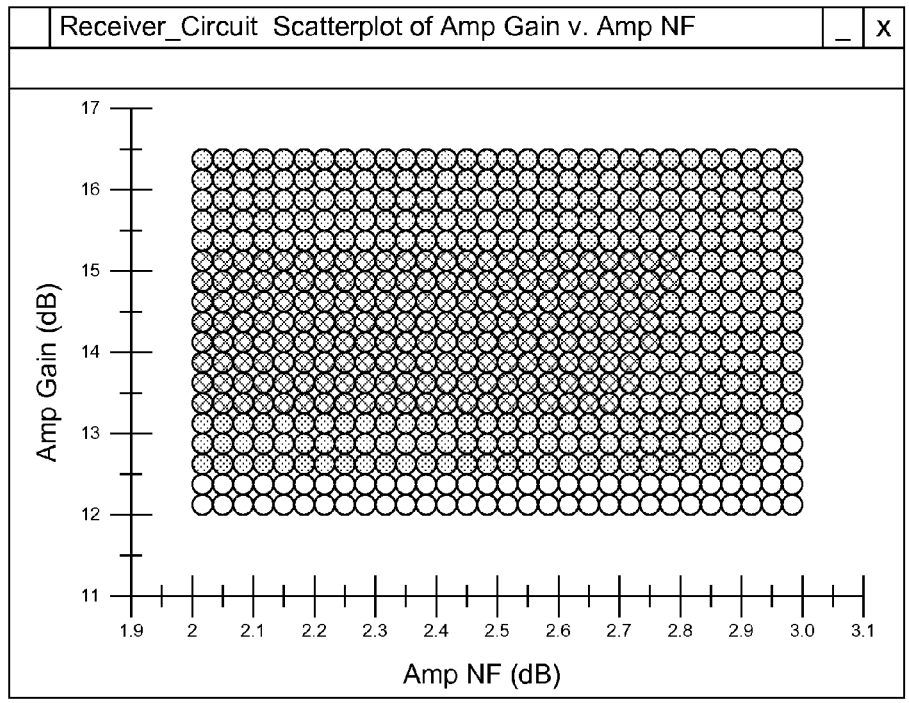

FIG. 8D illustrates another exemplary screen shot for visualizing cell specification data and corresponding system performance data in accordance with another embodiment of the invention. The processor 102 may cause the display of this screen shot on the user interface 104 using the data generated by any of the previously discussed data generation algorithm. The screen shot is an example of a scatter plot that denotes regions of cell specification that meet a system goals, that do not meet the system goal but are within a predetermined margin (e.g., 10 percent) of meeting the system goal, and that do not meet the system goal by greater than the predetermined margin. In this example, a similar visual indication mapping may be used to indicate such regions.

In the exemplary screen shot of FIG. 8D, the x- or horizontal axis of the graph indicates the NF of the amplifier 352 ranging from 1.9 to 3.1 dB. The y- or vertical axis of the graph indicates the gain of the amplifier 352 ranging from 11 to 17 dB. The graph further includes circular visual indicators to indicate points where a system goal is met, points that do not meet the system goal but are within a predetermined margin (e.g., 10 percent) of meeting the system goal, and points that do not meet the system goal by greater than the predetermined margin. For example, the circular visual indicators having the cross-hatching shade indicates a point where the corresponding amplifier gain and NF meet the system goals of gain 8-10 dB and NF of less than 3 dB. The circular visual indicators having the heavily-dense dots shade indicates a point where the corresponding amplifier gain and NF are within a predetermined margin (e.g., 10 percent) of meeting the system goals. The circular visual indicators having the solid hue indicates a point where the corresponding amplifier gain and NF do not meet at least one of the system goals by the predetermined margin. This graph may be useful to a designer in allocating cell specification for a system.

FIG. 8E illustrates another exemplary screen shot for visualizing cell specification data and corresponding system performance data in accordance with another embodiment of the invention. The processor 102 may cause the display of this screen shot on the user interface 104 using the data generated by any of the previously discussed data generation algorithm. The screen shot illustrates a visualization of a matrix of correlations useful for analysis of the cell meeting the cell specification. In particular, the screen shot includes a table identifying cell specifications in respective rows, such as the gain and NF of the amplifier 352, respectively. The column of the table includes a column to indicate the average sensitivity of the system goal to the corresponding cell specification. In this example, the average sensitivity of the system gain to the amplifier gain is 0.53, and the average sensitivity of the system NF to the amplifier NF is 0.47. The next two columns pertaining to the system gain and NF are used to visually indicate the sensitivity and distribution. For examples, the slope of the lines shown may visually illustrate the sensitivity of the system goal in relationship to the corresponding cell specification. The thickness of the lines may visually illustrate the distribution of the cell specifications.

Figure 8F:
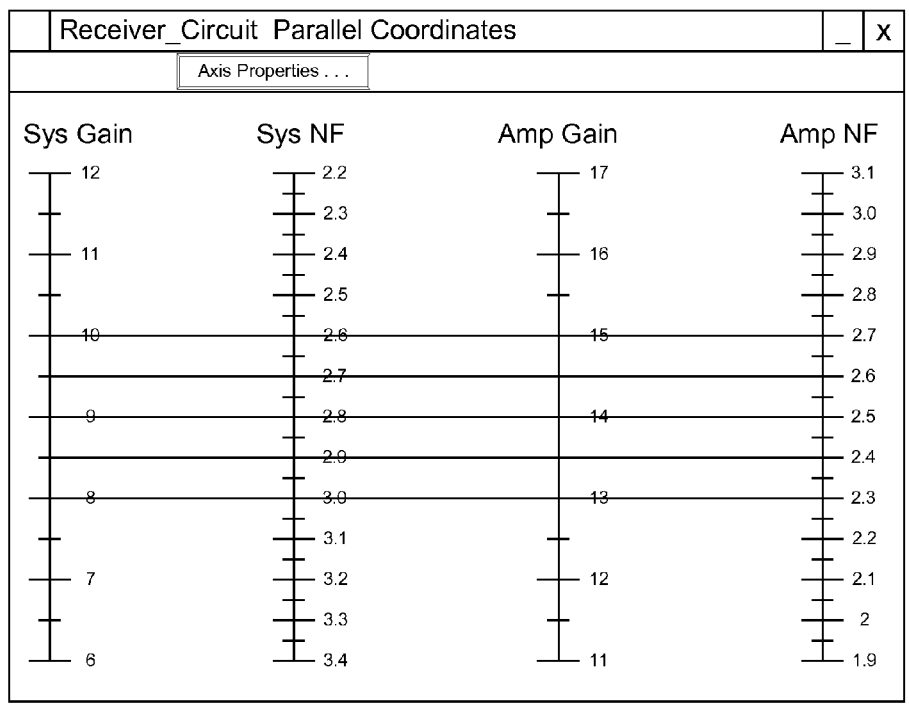

FIG. 8F illustrates another exemplary screen shot for visualizing cell specification data and corresponding system performance data in accordance with another embodiment of the invention. The processor 102 may cause the display of this screen shot on the user interface 104 using the data generated by any of the previously discussed data generation algorithm. The screen shot illustrates a visualization useful for comparing system goals with cell specifications. In particular, the screen shows a coordinate graph including a first set of coordinate plots aligned together pertaining to system goals or system performance data, system performance coordinate plots, such as the system gain plot ranging from 6 to 12 dB and a system NF ranging from 3.4 to 2.2 dB. The screen also shows a second set of coordinate plots pertaining to cell specifications, cell specification coordinate plots, such as an amplifier gain plot ranging from 11 to 17 dB and an amplifier NF plot ranging from 1.9 to 3.1 dB. Given other cell specifications being fixed, such as the gain and NF of the mixer 354, the screen shows horizontal lines corresponding cell specifications with system specifications. The coordinate graph may also assist a user with the allocation of cell specifications.

Figure 9:
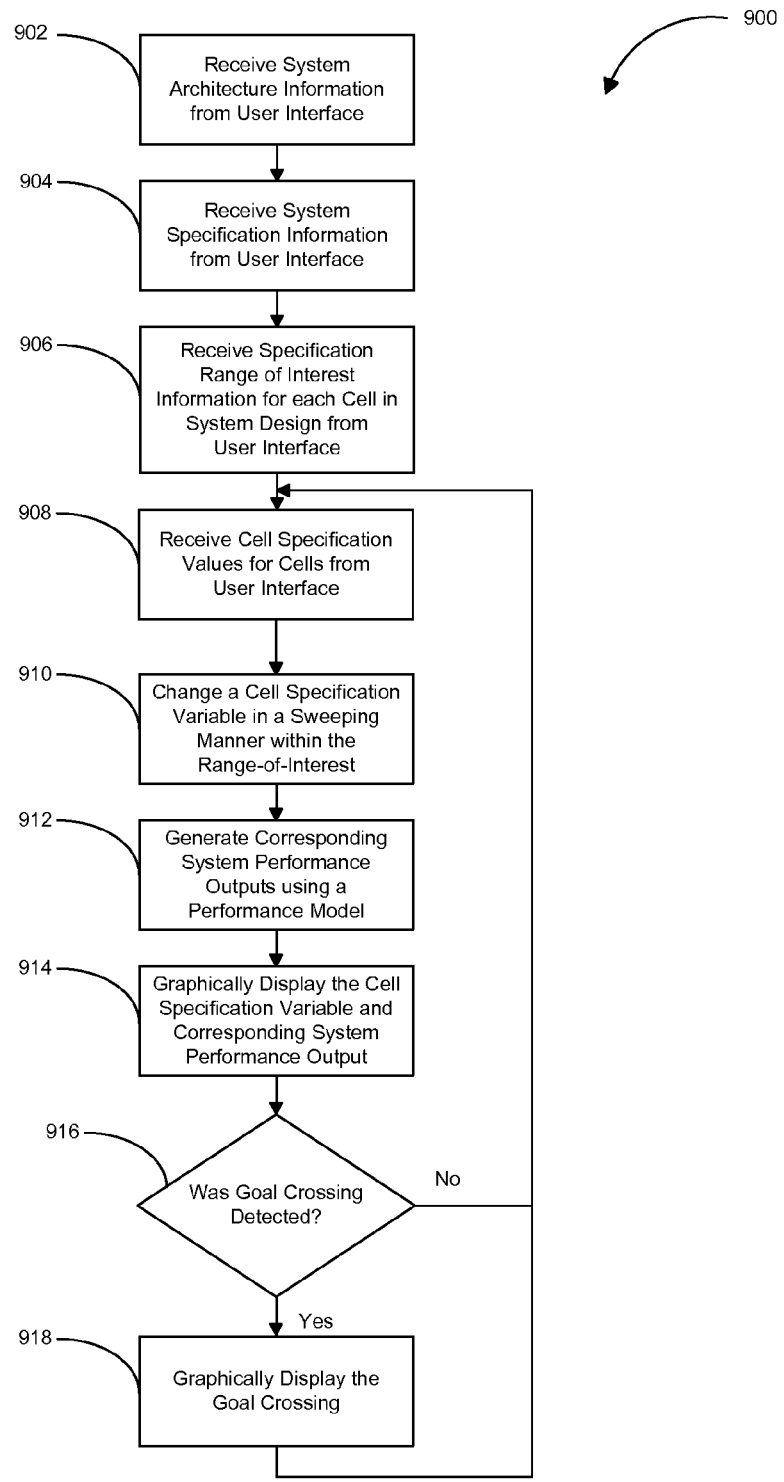
FIG. 9 illustrates a flow diagram of an exemplary method of generating and displaying candidate specification data of one or more cells of a system design in accordance with another embodiment of the invention.

FIG. 9 illustrates a flow diagram of an exemplary method 900 of generating and displaying candidate specification data of cells of a system in accordance with another embodiment of the invention. The method 900 computes relevant information "on the fly," based on interactive changes that a user makes to the cell specifications.

More specifically, according to the method 900, the processor 102 receives the system architecture information from the user via the user interface 104 (block 902). The processor 102 also receives the system specification information (e.g., the system goals) from the user via the user interface 104 (block 904). The processor 102 also receives specification range-of-interest information for each cell in the system from the user via the user interface 104 (block 906). The processor 102 then receives one or more nominal values for cell specifications (block 908). The processor 910 changes each cell specification variable in a sweeping manner within the corresponding range-of-interest, while the keeping other cell variables at their nominal values (block 910).

The processor 102 simulates each swept cell specification variable to generate corresponding system performance outputs (block 912). The processor 102 may use one or more analytic closed algorithms and/or one or more behavioral simulations algorithms to perform the system simulation. However, if the one or more behavioral simulations algorithm are complex and take up too much time to reduce the "on the fly" feel for the user, the processor 102 instead may use a prediction-based performance model to perform the simulation. Such prediction-based performance model includes support-vector regression model, cluster-weighted model, and others. The processor 102 then causes the graphical display of the cell specification variables and corresponding system performance outputs on the user interface 104 (block 914).

The processor 102 also compares the system performance outputs with the system specification information to determine whether a goal crossing has occurred (block 916). A goal crossing may be identified from the sweep data using linear interpolation. If the processor 102 determines that no goal crossing has occurred, the processor 102 may return to block 908 in response to the user changing one or more of the cell specification variables. If, on the other hand, the processor 102 determines that one or more goal crossing has occurred, the processor 102 causes the graphical display of the goal crossing (block 918). The processor 102 may then return to block 908 in response to the user changing one or more of the cell specification variables.

Figure 10:
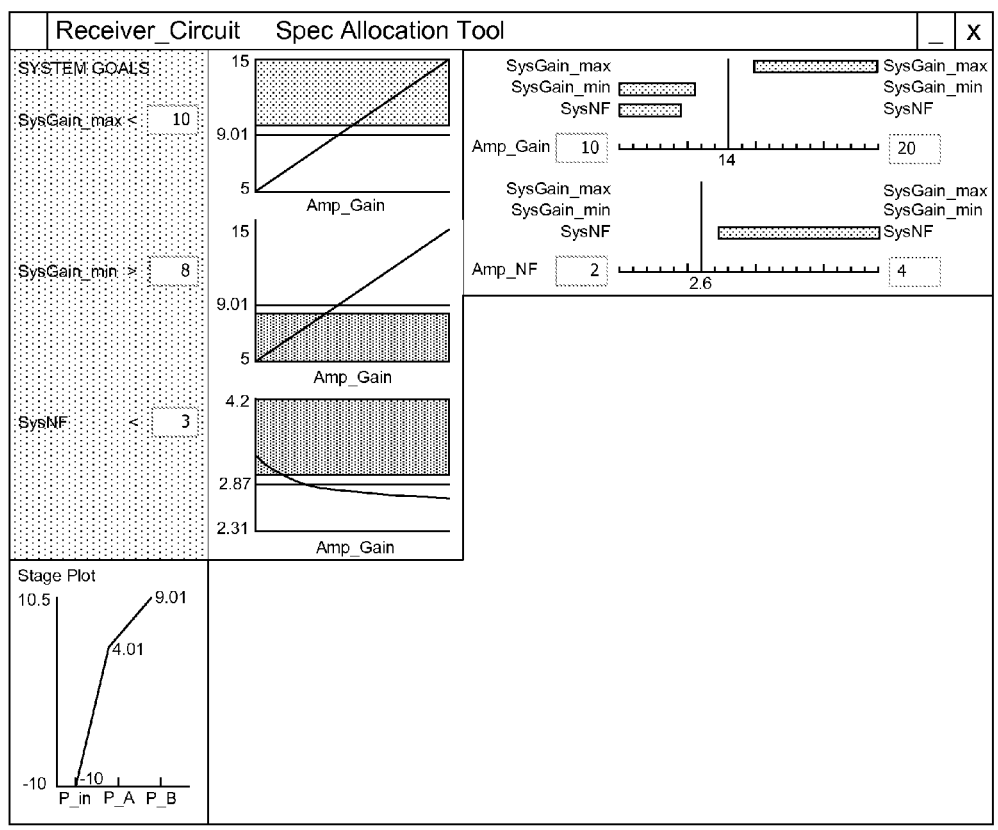
FIG. 10 illustrates another exemplary screen shot for visualizing cell specification data and corresponding system performance data in accordance with another embodiment of the invention.

FIG. 10 illustrates another exemplary screen shot for visualizing and cell specification data and corresponding system performance data in accordance with another embodiment of the invention. The processor 102 may cause the display of this screen shot on the user interface 104 as a result of the algorithm discussed with reference to FIG. 9. The screen may include a "System Goals" portion including input objects for receiving system goals from the user via the user interface 104. For instance, in this example, the "System Goals" portion includes an input to set the maximum system gain "SysGain_max<10", an input to set the minimum system gain "SysGain_min>8", and an input to set the maximum system "NF "SysNF<3."

The "System Goals" portion of the screen also includes graphs strategically positioned next to the "SysGain_max<10", SysGain_min>8", and "NF "SysNF<3" information. The graph illustrates the relationship of the corresponding system goal to the cell specification including goal crossing and denoted region in which the system performance do not meet the goal. For example, the graph next to the "SysGain_max<10" includes the diagonal line indicating the relationship between the system gain and the amplifier gain, a horizontal line indicating the goal crossing of the maximum 10 dB system gain, and a shaded region above the goal crossing indicating the region where the system performance does not meet the goal. Similarly, the graph next to the "SysGain_min>8" includes the diagonal line indicating the relationship between the system gain and the amplifier gain, a horizontal line indicating the goal crossing of the minimum 8 dB system gain, and a shaded region below the goal crossing indicating the region where the system performance does not meet the goal. In a similar manner, the graph next to the "SysNF<3" includes a curved function indicating the relationship between the system NF and the amplifier gain, a horizontal line indicating the goal crossing of the maximum 3 dB system NF, and a shaded region above the goal crossing indicating the region where the system performance does not meet the goal. The user may select which cell specification to plot.

The screen further includes another portion (in this example, at a upper-right portion of the screen) having input objects for receiving range-of-interest and nominal values for cell specifications. For example, the screen includes respective input objects to receive the minimum and maximum values for the range-of-interest for the amplifier gain (e.g., 10 to 20 dB). The nominal value may be graphically adjusted by laterally moving a vertical line along a graph depicting the range-of-interest. For example, the vertical line or nominal value for the amplifier gain is set to 14 dB.

Further, above the graph, horizontal bars indicate regions where the corresponding cell specification produces system performance outputs that fall outside of the respective system goals. For example, the horizontal bar pertaining to the "Sys_Gain_max" indicates that an amplifier gain above 15 dB would produce a system gain that does not meet the system gain goal of being below 10 dB. The horizontal bar pertaining to the "Sys_Gain_min" indicates that an amplifier gain below 12.8 dB would produce a system gain that does not meet the system gain goal of being above 8 dB. The horizontal bar pertaining to the "SysNF" indicates that an amplifier gain below 12.4 dB would produce a system NF that does not meet the system NF goal of being below 3 dB. The distances between the nominal value line and the respective ends of the horizontal bars indicate the respective margins-of-errors for the respective system goals.

Similarly, with regard to the amplifier NF, the screen includes respective input objects to receive the minimum and maximum values for the range-of-interest for the amplifier NF (e.g., 2 to 4 dB). Also, the vertical line or nominal value for the amplifier NF is set to 2.6 dB. The horizontal bar pertaining to the "SysNF" indicates that an amplifier NF above 2.7 dB would produce a system NF that does not meet the system NF goal of being below 3 dB. Again, the distance between the nominal value line and the horizontal bar indicate the margin-of-error for the system NF. In this example, the margin-of-error is approximately 0.1 dB.

Finally, the screen further includes a stage plot at its lower-left hand corner. The stage plot provides information regarding the measured gain at different stages of the signal path. For example, the input signal may be at a power level of −10 dBm. The first amplification stage of the amplifier may increase the power level of the input signal to 4.01 dBm. The second amplification stage of the amplifier may increase the power level of the input signal to 9.01 dBm.

Figure 11:
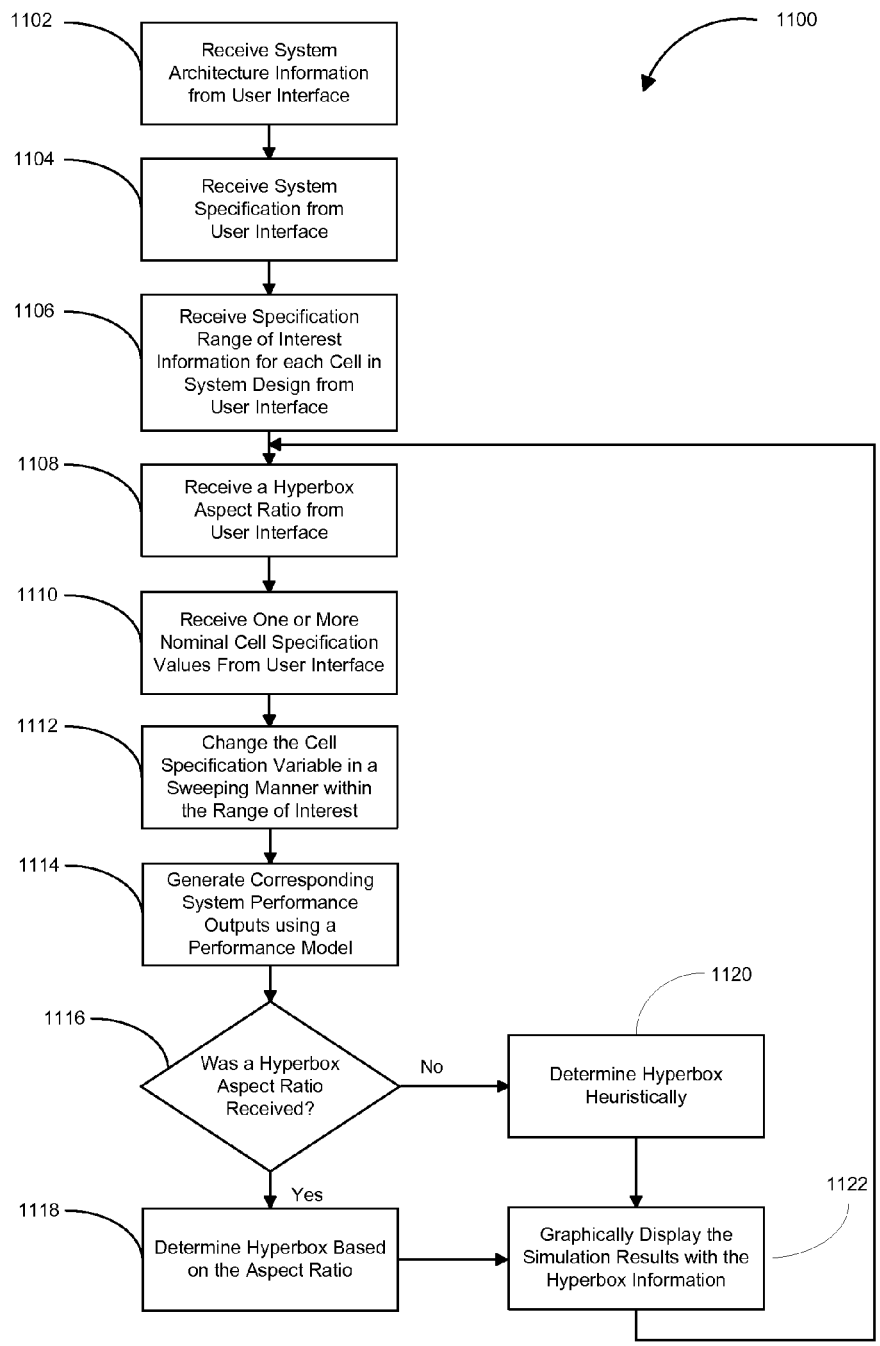
FIG. 11 illustrates an exemplary method for generating and displaying an exemplary hyperbox in accordance with another embodiment of the invention.

FIG. 11 illustrates an exemplary method 1100 for generating and displaying a hyperbox in accordance with another embodiment of the invention. As previously discussed, given a hyperbox that lies entirely within a feasible region of the specification space, each specification value is free to vary independently within its 1-dimensional subinterval, and the combination of the cell specifications is still guaranteed to be feasible. Additionally, a hyperbox may also be used to define the margins associated with respective cell specifications.

More specifically, according to the method 1100, the processor 102 receives the system architecture information from the user via the user interface 104 (block 1102). The processor 102 also receives the system specification information (e.g., one or more system goals) and performance model from the user via the user interface 104 (block 1104). Additionally, the processor 102 receives specification range-of-interest for each cell of the system from the user via the user interface 104 (block 1106). The processor 102 may also receive an aspect ratio for the to-be generated hyperbox from the user via the user interface 104 (block 1108). The processor 102 also receives one or more nominal cell specification values from the user via the user interface 104 (block 1110).

The processor 102 changes each cell specification variable in a sweeping manner within the corresponding range-of-interest, while the keeping other cell variables at their nominal values (block 1112). The processor 102 simulates each swept cell specification variable to generate corresponding system outputs (block 1114). The processor 102 may use one or more analytic closed algorithms and/or one or more behavioral simulations algorithms to perform the system simulation. However, if the one or more behavioral simulations algorithms are complex and take up too much time to reduce the "on the fly" feel for the user, the processor 102 instead may use a prediction-based performance model to perform the simulation. Such prediction-based performance model includes support-vector regression model, cluster-weighted model, and others.

The processor 102 then determines whether it received an expansion direction vector for the to-be generated hyperbox from the user in block 1108 (block 1116). If the processor 102 received the expansion direction vector from the user, the processor 102 generates the hyperbox based on the expansion direction vector (block 1118). For each system goal, a line search in the expansion vector direction may be performed looking for either a goal crossing or a domain boundary. Where the search ends, a corner of a hyperbox is placed. At the end, each goal will have its own hyperbox, and they may be merged together to produce the final hyperbox.

If, on the other hand, the processor 102 did not receive an expansion direction vector from the user, the processor 102 generates the hyperbox heuristically (block 1120). In either case (block 1118 or 1120), the processor 102 causes the graphical display of the hyperbox on the user interface 104 (block 1122). The processor 102 may then return to block 1108 to repeat the process for a new hyperbox expansion direction vector and/or a change to the nominal cell specification value.

FIG. 12A graphically illustrates in two dimensions exemplary methods of generating a hyperbox heuristically in accordance with another embodiment of the invention. The left side of FIG. 12A graphically illustrates the exemplary method of heuristically determining the hyperbox in the case where a goal crossing is known. The right side graphically illustrates the exemplary method of heuristically determining the hyperbox in the case where a goal crossing is not known. While the problem is n-dimensional and FIG. 12A only illustrates two dimensions, a graph or chart illustrating more than two dimensions may be used to illustrate the problem.

In the case of the goal crossing are known, the aspect ratio or direction of expansion may be given by ratio of the distance from a goal crossing to the nominal value for the first cell specification divided by the distance from a goal crossing to the nominal value for the second cell specification. In the case the goal crossing are not known, the edge of the user-defined range-of-interest is used to determine the hyperbox. Thus, in such a case, the aspect ratio or direction of expansion may be given by ratio of the distance from an edge of range-of-interest or goal crossing to the nominal value for the first cell specification divided by the distance from an edge of range-of-interest or goal crossing to the nominal value for the second cell specification.

FIG. 12B illustrates an exemplary screen shot for visualizing a hyperbox two dimensions in accordance with another embodiment of the invention. The right side of the screen may include a graph similar to FIG. 7 with a shaded hyperbox as shown and a dot situated therein to indicate the nominal point. Two vertical bars below and above the nominal value and the feasibility boundary lines indicate regions where the system outputs do not meet the system goals. Similarly, two horizontal bars to the left and right of the nominal value and the feasibility boundary lines also indicate regions where the system performance outputs do not meet the system goals. The left side of the screen is similar to the upper-right side of the screen depicted in FIG. 10, except the vertical nominal value line of FIG. 10 is replaced with a region indicating the range of the corresponding hyperbox.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of generating candidate cell specifications for one or more cells of a system design, the method comprising:
   receiving system architecture information pertaining to the system design;
   receiving system specification information pertaining to the system design;
   receiving specification range-of-interest information for each cell specification of the system design;
   receiving intra-range preference information for the range-of-interest for each cell specification of the system design; and
   generating a set of cell specifications for the one or more cells of the system design based on the system architecture information, system performance information, specification range-of-interest information, and intra-range preference information.

2. The method of claim 1, wherein
   the set of cell specifications are located substantially at a boundary of a region of cell specifications that meet the system performance.

3. The method of claim 1, wherein
   the set of cell specifications includes a set of alternate system-pareto-optimal solutions.

4. The method of claim 1, further comprising:
   displaying the set of cell specifications.

5. The method of claim 1, further comprising:
   graphically displaying the set of cell specifications along a boundary of a region of cell specifications that meet the system specification.

6. The method of claim 1, wherein
   the receiving and the generating are controlled by program instructions stored on a computer readable medium.

7. The method of claim 1, wherein
   the receiving and the generating are performed by a processor.

8. A method of displaying cell specification data and corresponding system performance data of a system design comprising at least one cell, the method comprising:
   displaying a first bar chart including one or more bars related to a system performance, wherein the length of each bar is related to a number of system performance data generated for a corresponding sub-range of a predetermined range of the system performance; and
   providing one or more visual indicators for each bar to indicate whether or not at least a portion of the system performance data pertaining to the corresponding bar meets a predetermined system specification.

9. The method of claim 8, wherein
   the one or more visual indicators comprise a distinct color, a distinct shade, a distinct symbol, a distinct word, or a distinct code.

10. The method of claim 8, wherein
    the one or more visual indicators comprise
    a first visual indicator to indicate that the corresponding system performance data meet the predetermined system specification, and
    a second visual indicator to indicate that the corresponding system performance data do not meet the predetermined system specification.

11. The method of claim 8, wherein
    the one or more visual indicators comprise
    a first visual indicator to indicate that the corresponding system performance data meet the predetermined system specification,
    a second visual indicator to indicate that the corresponding system performance data do not meet the predetermined system specification but is within a predetermined margin of meeting the predetermined system specification, and
    a third visual indicator to indicate that the corresponding system performance data do not meet the predetermined system specification by a margin greater than the predetermined margin.

12. The method of claim 8, further comprising:
    displaying a second bar graph including one or more bars related to a cell performance of the at least one cell, wherein the length of each bar is related to a number of cell specification data generated for a corresponding sub-range of a predetermined range of the cell specification.

13. The method of claim 12, further comprising:
    displaying a selectable system performance range that is adapted to be graphically manipulated by a user;
    providing another visual indicator for each bar corresponding to system performance data that fall outside of the selectable system performance range; and
    providing another visual indicator for each bar corresponding to the cell specification data that corresponds to the system performance data that fall outside of the selectable system performance range.

14. The method of claim 13, further comprising:
    displaying a third bar graph including one or more bars related to a second system performance, wherein the length of each bar is related to a number of second system performance data generated for a corresponding sub-range of a predetermined range of the second system performance;
    providing one or more visual indicators for each bar that indicates whether or not at least a portion of the second system performance data pertaining to the corresponding bar meets a second predetermined system specification; and
    providing another visual indicator for each bar corresponding to the second system performance data that corresponds to the cell specification data that corresponds to the system performance data that fall outside of the selectable system performance range.

15. The method of claim 12, further comprising:
    graphically displaying sensitivity information related to the system performance data and the corresponding cell specification data.

16. The method of claim 12, further comprising:
    graphically displaying a scatter plot illustrating information related to the system performance data and system specification and two or more cell specification data.

17. The method of claim 12, further comprising:
    graphically displaying a coordinate graph including one or more system performance coordinate plots relating to system performance data, one or more cell specification coordinate plots relating to one or more cell specification data, and one or more lines connecting one or more respective regions of the one or more system performance coordinate plots to one or more respective regions of the one or more cell specification coordinate plots.

18. The method of claim 8, wherein
the elements of the method are controlled by program instructions stored on a computer readable medium.

19. The method of claim 8, wherein
the elements of the method are performed by a processor.

20. A system for allocation of specifications for a hierarchical system, the system comprising:
a computer system including one or more processors and a processor readable storage memory coupled together;
code recorded in the processor readable storage medium to receive system architecture and system specification information of a hierarchical system design and nominal value and range of interest information pertaining to cells of the system design;
code recorded in the processor readable storage medium to generate a first set of cell specification data within the corresponding range-of-interest of a selected cell of the system design, while maintaining the cell specification data for the remaining one or more cells of the system design at their respective nominal values; and
code recorded in the processor readable storage medium to simulate the first set of cell performance data of the selected cell with a performance model to generate a first set of corresponding system performance data of the system design.

21. The system of claim 20, wherein
the performance model is based on one or more closed analytical equations or one or more behavioral models.

22. The system of claim 20, wherein
the performance model is based on a prediction-based performance model.

23. The system of claim 22, wherein
the prediction-based performance model includes a support-vector regression model or a cluster-weighted model.

24. The system of claim 20, wherein
the computer system further includes a user interface, and the system further comprises:
code recorded in the processor readable storage medium to graphically display in the user interface a first visual indicator of a relationship between the plurality of cell performance data of the selected cell and the corresponding system performance data of the system design.

25. The system of claim 24, further comprising:
code recorded in the processor readable storage medium to determine whether the relationship crosses a system specification value of the system design; and
code recorded in the processor readable storage medium to graphically display in the user interface a second visual indicator of the system specification value in relationship with the first visual indicator.

26. The system of claim 25, further comprising:
code recorded in the processor readable storage medium to graphically display in the user interface a third visual indicator for a region in which a portion of the first visual indicator lies that corresponds to system performance data that do not meet the system specification value.

* * * * *